(12) United States Patent
Baheti et al.

(10) Patent No.: US 11,416,077 B2
(45) Date of Patent: Aug. 16, 2022

(54) GESTURE DETECTION SYSTEM AND METHOD USING A RADAR SENSOR

(71) Applicant: Infineon Technologies AG, Neubiberg (DE)

(72) Inventors: Ashutosh Baheti, Munich (DE); Avik Santra, Munich (DE); Mandy Barsilai Fernandez, Murphy, TX (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/040,019

(22) Filed: Jul. 19, 2018

(65) Prior Publication Data
US 2020/0026361 A1    Jan. 23, 2020

(51) Int. Cl.
*G06F 3/01* (2006.01)
*G06F 3/041* (2006.01)
*G01S 13/06* (2006.01)
*G06F 3/0488* (2022.01)
(Continued)

(52) U.S. Cl.
CPC .............. *G06F 3/017* (2013.01); *G01S 13/06* (2013.01); *G01S 13/87* (2013.01); *G06F 3/0416* (2013.01); *G06F 3/04883* (2013.01)

(58) Field of Classification Search
None
See application file for complete search history.

(56) References Cited

U.S. PATENT DOCUMENTS

| 4,241,347 A | 12/1980 | Albanese et al. |
| 5,774,091 A | 6/1998 | McEwan |
| 6,147,572 A | 11/2000 | Kaminski et al. |

(Continued)

FOREIGN PATENT DOCUMENTS

| CN | 1463161 A | 12/2003 |
| CN | 1716695 A | 1/2006 |

(Continued)

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

(Continued)

*Primary Examiner* — Patrick N Edouard
*Assistant Examiner* — Peijie Shen
(74) *Attorney, Agent, or Firm* — Slater Matsil, LLP

(57) ABSTRACT

A controller is configured to be coupled to a millimeter-wave radar mounted on a device, where the millimeter-wave radar includes a field of view in a direction away from the device. The controller is configured to: detect a presence of an object in a first range zone of a plurality of range zones of the field of view, where each range zone of the plurality of range zones respectively corresponds to different distance ranges relative to the device, and where each range zone is associated with a respective command database; determine a gesture signature based on detecting the presence of the object in the first range zone of the field of view; and cause execution of a command chosen from the respective command database associated with the first range zone as a function of the gesture signature.

20 Claims, 22 Drawing Sheets

(51) Int. Cl.
*G06F 3/04883* (2022.01)
*G01S 13/87* (2006.01)

(56) References Cited

U.S. PATENT DOCUMENTS

| | | | |
|---|---|---|---|
| 6,266,004 B1 * | 7/2001 | Pannert | G01S 7/352 342/104 |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,110,541 B1 * | 8/2015 | Zhou | G06F 3/042 |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,477,324 B2 * | 10/2016 | Ajmera | G06F 3/017 |
| 9,495,600 B2 | 11/2016 | Heu et al. | |
| 9,886,095 B2 | 2/2018 | Pothier | |
| 9,935,065 B1 | 4/2018 | Baheti et al. | |
| 9,971,415 B2 * | 5/2018 | Poupyrev | G06F 3/014 |
| 10,088,908 B1 * | 10/2018 | Poupyrev | G06F 3/017 |
| 10,241,581 B2 * | 3/2019 | Lien | G01S 13/66 |
| 2002/0014985 A1 | 2/2002 | Wurman | G01S 13/003 342/26 R |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0228841 A1 * | 9/2009 | Hildreth | G06F 3/0304 715/863 |
| 2009/0315761 A1 | 12/2009 | Walter et al. | |
| 2010/0207805 A1 | 8/2010 | Haworth | |
| 2011/0018795 A1 | 1/2011 | Jang | |
| 2011/0090155 A1 * | 4/2011 | Caskey | G06F 3/04886 345/173 |
| 2011/0119640 A1 | 5/2011 | Berkes et al. | |
| 2011/0299433 A1 | 12/2011 | Darabi et al. | |
| 2011/0312349 A1 | 12/2011 | Forutanpour et al. | |
| 2012/0084673 A1 * | 4/2012 | Sirpal | G06F 3/0412 715/761 |
| 2012/0087230 A1 | 4/2012 | Guo et al. | |
| 2012/0092284 A1 * | 4/2012 | Rofougaran | G06F 3/017 345/173 |
| 2012/0102438 A1 * | 4/2012 | Robinson | G06F 3/011 715/863 |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 * | 11/2012 | Wang | G06F 3/0488 345/156 |
| 2013/0007616 A1 * | 1/2013 | Bell | G06F 3/017 715/709 |
| 2013/0027240 A1 | 1/2013 | Chowdhury | |
| 2013/0100008 A1 * | 4/2013 | Marti | G06F 3/011 345/156 |
| 2013/0106673 A1 | 5/2013 | McCormack et al. | |
| 2013/0170699 A1 * | 7/2013 | Bran | G06F 3/017 382/103 |
| 2014/0027606 A1 * | 1/2014 | Raynor | G06F 3/017 250/208.1 |
| 2014/0028542 A1 | 1/2014 | Lovitt et al. | |
| 2014/0047395 A1 | 2/2014 | Geurts et al. | |
| 2014/0050354 A1 | 2/2014 | Heim et al. | |
| 2014/0070994 A1 | 3/2014 | Schmalenberg et al. | |
| 2014/0078318 A1 * | 3/2014 | Alameh | G06F 3/0304 348/207.99 |
| 2014/0145883 A1 | 5/2014 | Baks et al. | |
| 2014/0208275 A1 * | 7/2014 | Mongia | G06F 3/0304 715/863 |
| 2014/0223385 A1 * | 8/2014 | Ton | G06F 3/0488 715/863 |
| 2014/0313135 A1 * | 10/2014 | Pisters | G06F 3/0484 345/173 |
| 2014/0324888 A1 | 10/2014 | Xie et al. | |
| 2015/0100926 A1 * | 4/2015 | Berkes | G06F 3/011 715/863 |
| 2015/0109242 A1 * | 4/2015 | Wei | G06F 3/044 345/174 |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0248167 A1 * | 9/2015 | Turbell | G06F 3/017 715/754 |
| 2015/0277569 A1 * | 10/2015 | Sprenger | G06F 3/017 345/156 |
| 2015/0293216 A1 * | 10/2015 | O'Dea | B60W 30/12 701/23 |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 * | 2/2016 | Poupyrev | G06F 3/017 345/156 |
| 2016/0041618 A1 | 2/2016 | Poupyrev | |
| 2016/0054803 A1 * | 2/2016 | Poupyrev | G06F 3/017 345/156 |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 * | 11/2016 | Poupyrev | G06F 3/0325 |
| 2016/0320853 A1 | 11/2016 | Lien et al. | |
| 2016/0327633 A1 | 11/2016 | Kumar et al. | |
| 2016/0334501 A1 * | 11/2016 | Ling | G01S 13/931 |
| 2016/0334502 A1 | 11/2016 | Ali et al. | |
| 2016/0349845 A1 | 12/2016 | Poupyrev et al. | |

(56) References Cited

U.S. PATENT DOCUMENTS

| | | | |
|---|---|---|---|
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0138109 A1* | 5/2017 | Wei enburger | E05F 15/40 |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1* | 12/2017 | Malysa | G01S 7/415 |
| 2018/0024233 A1* | 1/2018 | Searcy | G01S 7/032 342/125 |
| 2018/0046255 A1* | 2/2018 | Rothera | G01S 7/412 |
| 2018/0059233 A1 | 3/2018 | DiPoala et al. | |
| 2018/0074173 A1 | 3/2018 | Trotta et al. | |
| 2018/0081051 A1* | 3/2018 | Michelini | G01S 13/9023 |
| 2018/0101239 A1 | 4/2018 | Yin et al. | |
| 2018/0107280 A1* | 4/2018 | Oh | G01R 31/001 |
| 2018/0170514 A1* | 6/2018 | Bennett | G01S 7/003 |
| 2018/0173373 A1* | 6/2018 | Hill | G06F 3/0481 |
| 2018/0196501 A1* | 7/2018 | Trotta | G06F 3/011 |
| 2018/0224980 A1* | 8/2018 | Avila | G01S 13/876 |
| 2018/0239438 A1* | 8/2018 | Xue | G06F 3/01 |
| 2018/0336308 A1* | 11/2018 | Dokken | G01S 7/003 |
| 2018/0343023 A1* | 11/2018 | Park | H04M 1/72519 |
| 2018/0348340 A1* | 12/2018 | Lien | G01S 13/581 |
| 2018/0348353 A1* | 12/2018 | Lien | G01S 7/006 |
| 2018/0372844 A1* | 12/2018 | Jungmaier | G01S 7/41 |
| 2018/0373340 A1* | 12/2018 | Cheng | G09G 3/00 |
| 2019/0072659 A1* | 3/2019 | Gu | G01S 13/42 |
| 2019/0240535 A1* | 8/2019 | Santra | A63B 22/025 |
| 2019/0265345 A1* | 8/2019 | Jungmaier | G01S 13/08 |
| 2019/0353753 A1* | 11/2019 | Gebhardt | G06N 3/08 |
| 2020/0256983 A1* | 8/2020 | Veyrac | B64C 1/36 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |
| WO | 2017200571 A1 | 11/2017 |

OTHER PUBLICATIONS

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

(56) References Cited

OTHER PUBLICATIONS

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Knuth, D. et al., "Knuth-Morris-Pratt algorithm" Wikipedia, https://en.wikipedia.org/wiki/Knuth%E2%80%93Morris%E2%80%93Pratt_algorithm, May 16, 2018, 7 pages.

Wikipedia, "Touchscreen", https://en.wikipedia.org/wiki/Touchscreen, May 16, 2018, 16 pages.

Infineon, "Using BGT24MTR11 in Low Power Applications", BGT24MTR11, 24 Ghz Radar, RF and Protection Devices, Application Note AN341, Revision: Rev. 1.0, Dec. 2, 2013, 25 pages.

Texas Instruments, "XWR1xxx Power Management Optimizations—Low Cost LC Filter Solution", Application Report SWRA577—Oct. 2017, 19 pages.

Texas Instruments, "Programming Chirp Parameters in TI Radar Devices", Application Report SWRA553—May 2017, 15 pages.

Richards, Mark A., "Fundamentals of Radar Signal Processing," McGraw Hill Electronic Engineering, ISBN: 0-07-144474-2, Jun. 2005, 93 pages.

\* cited by examiner cross-section view top view

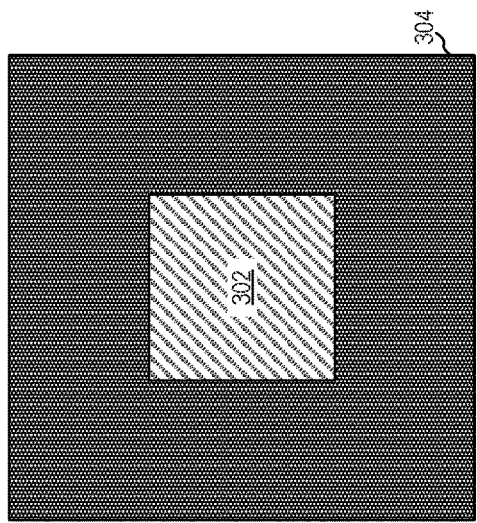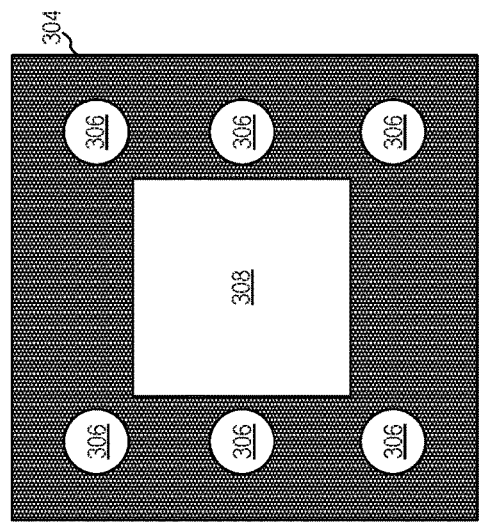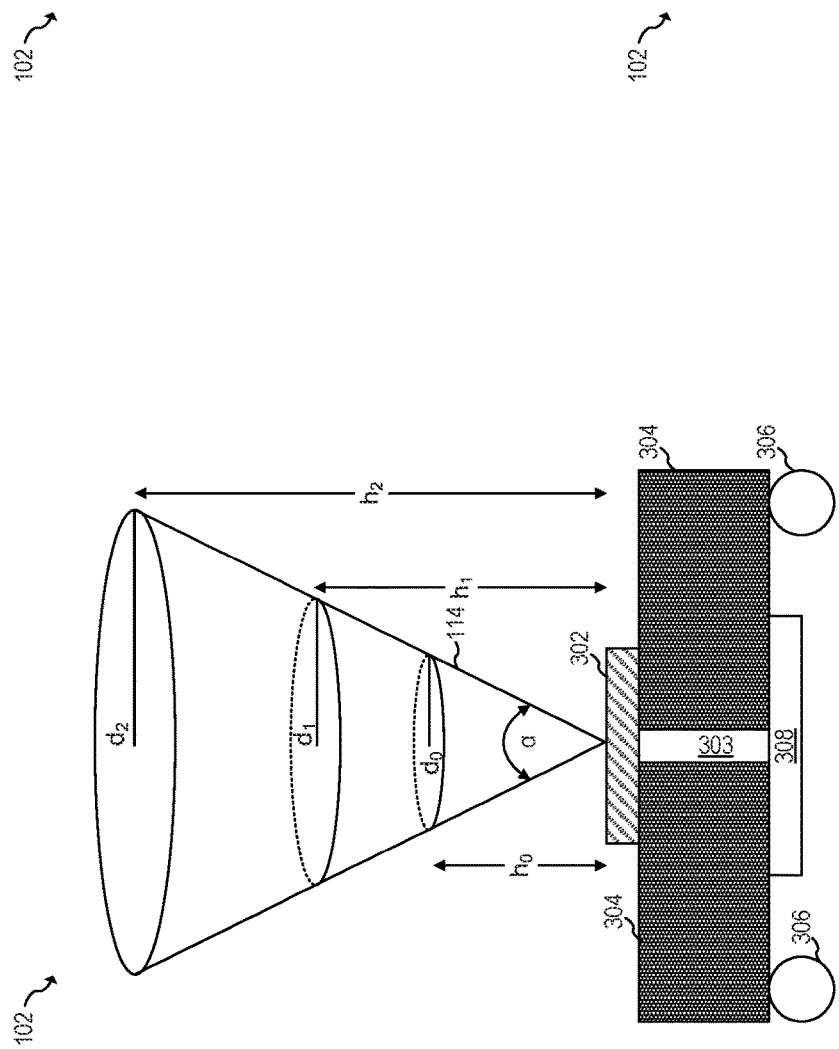

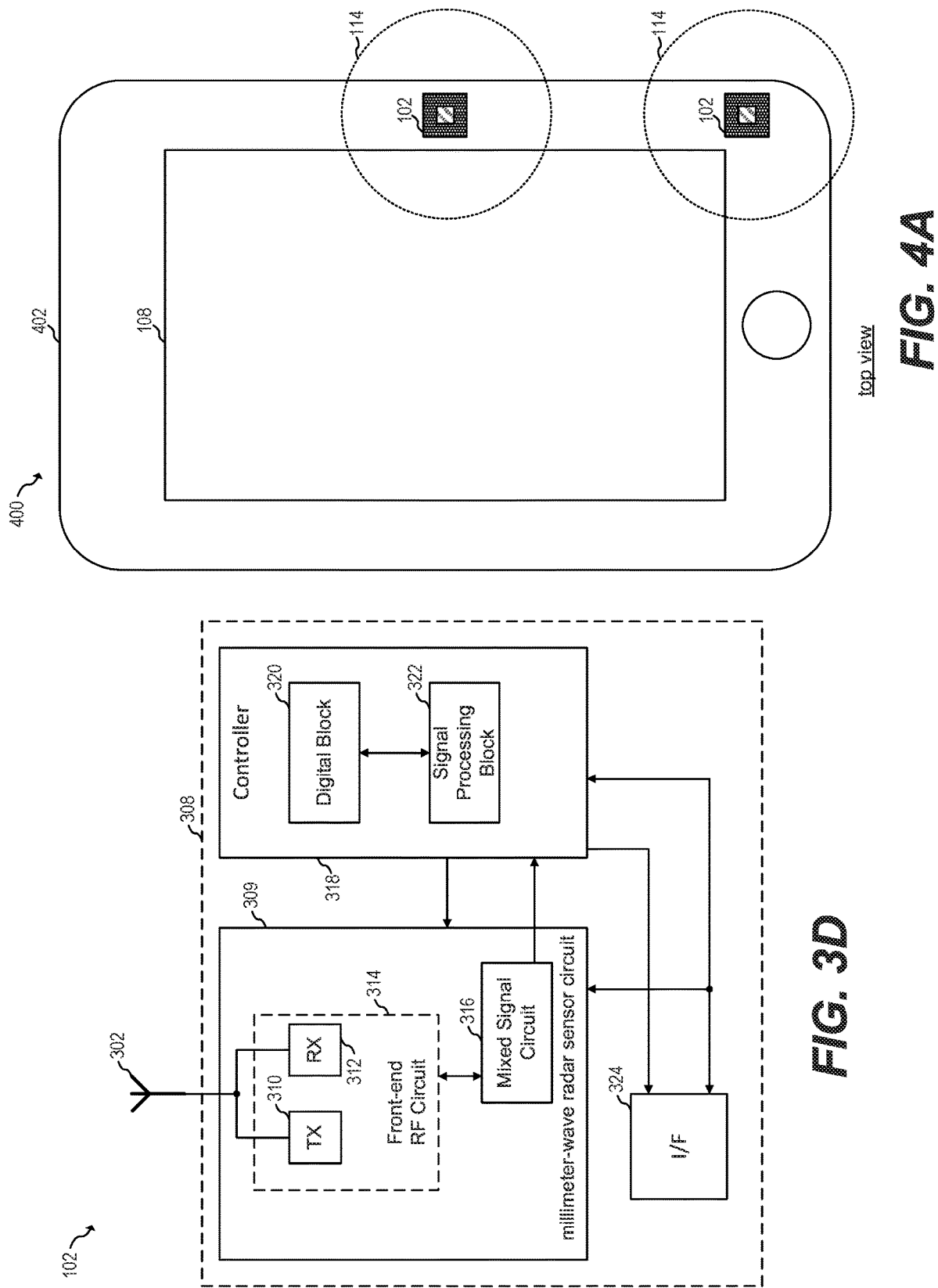

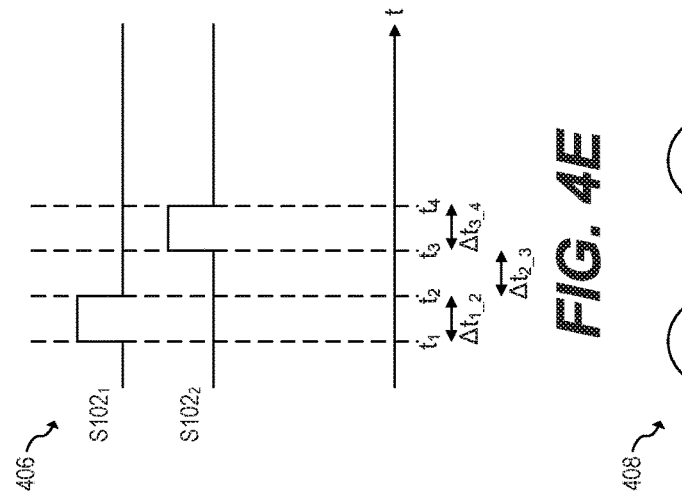
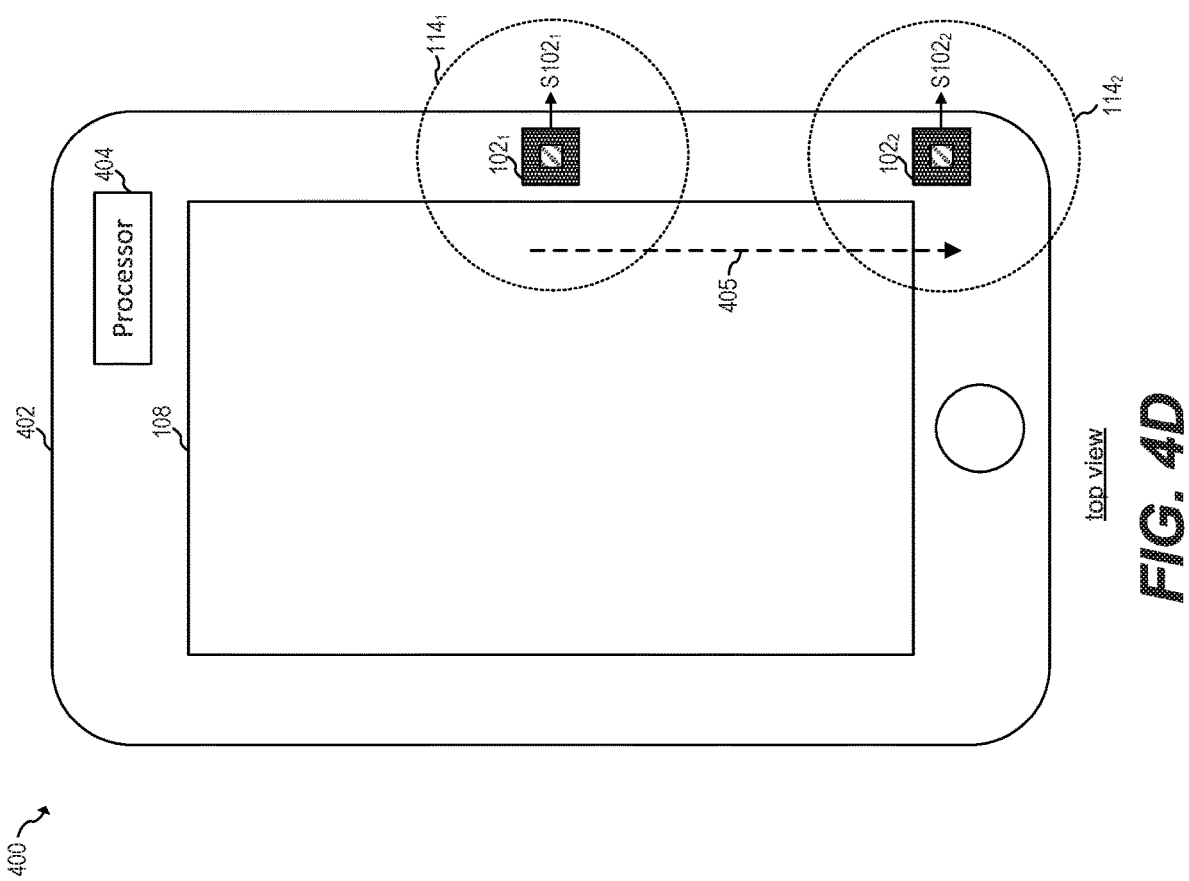

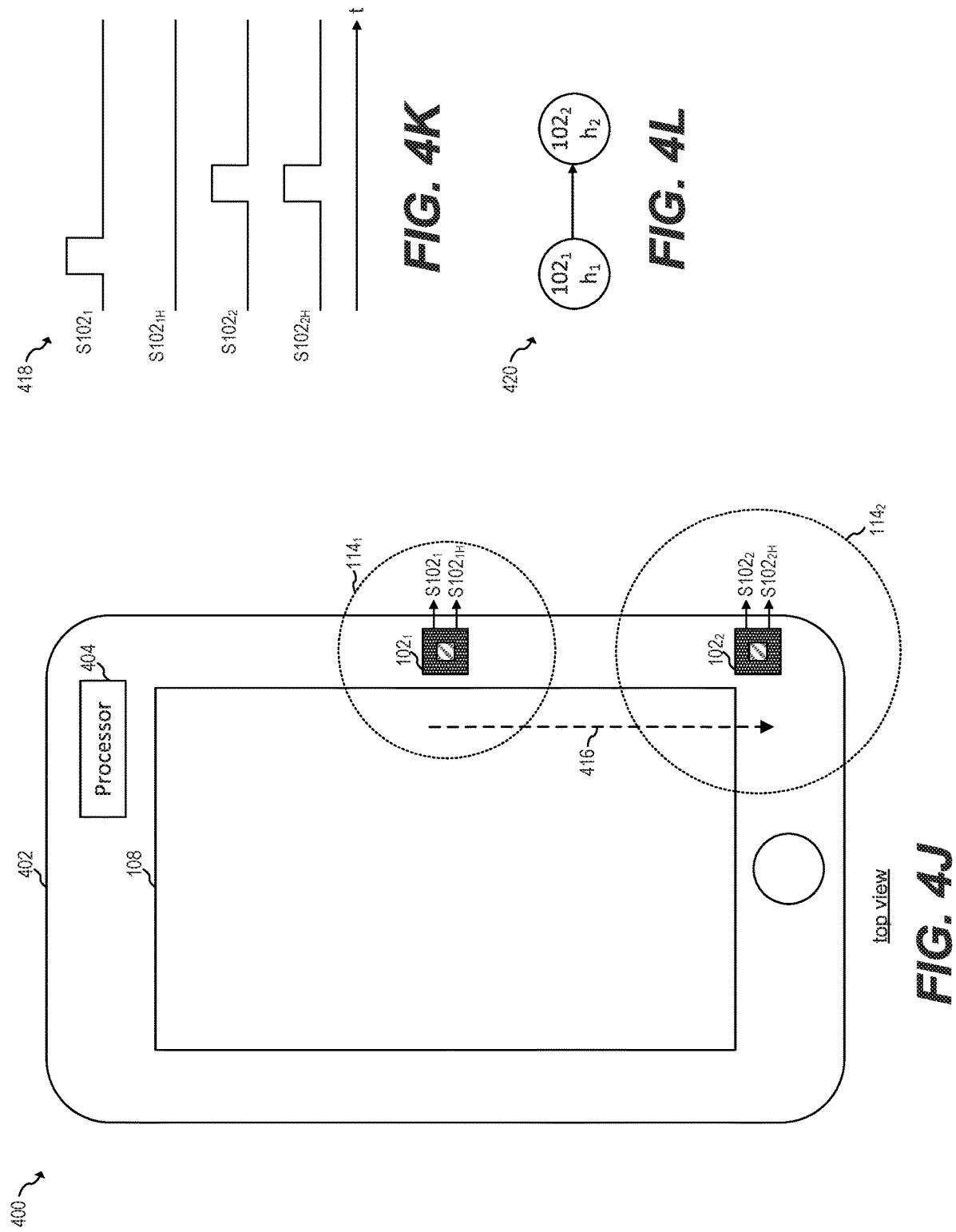

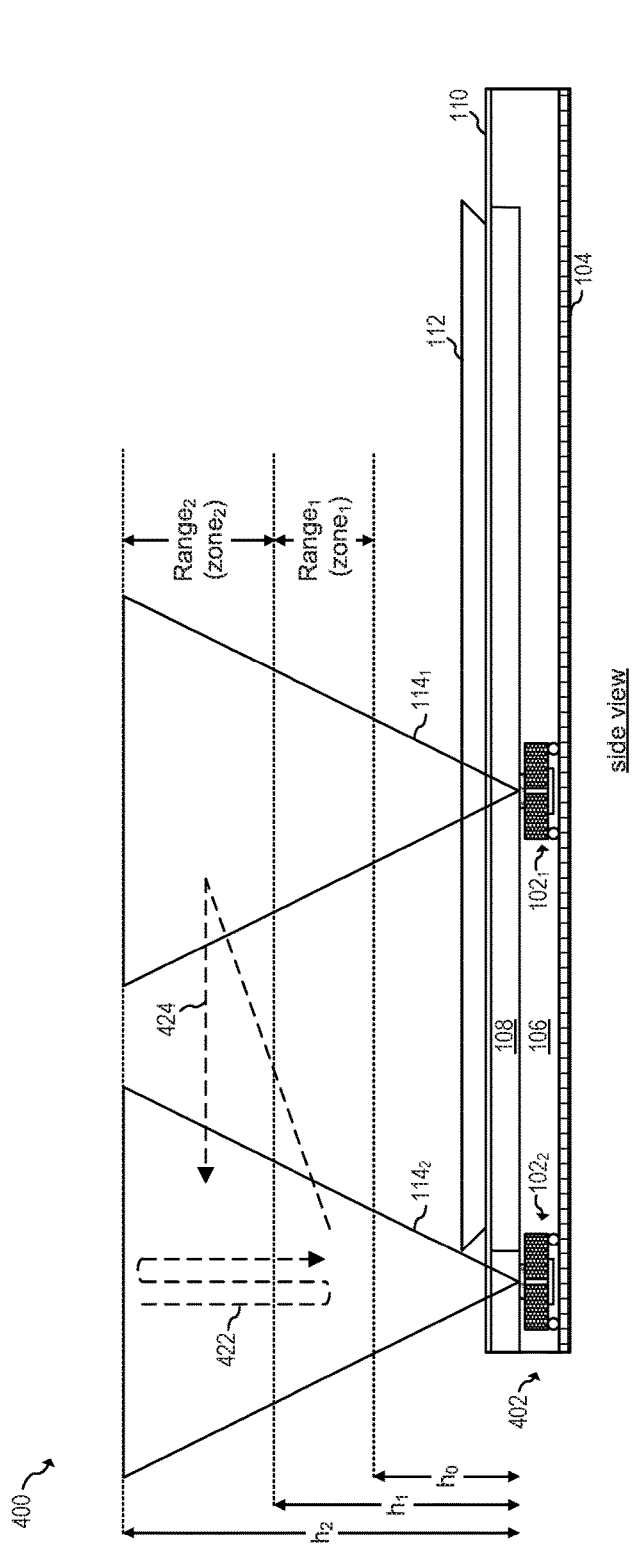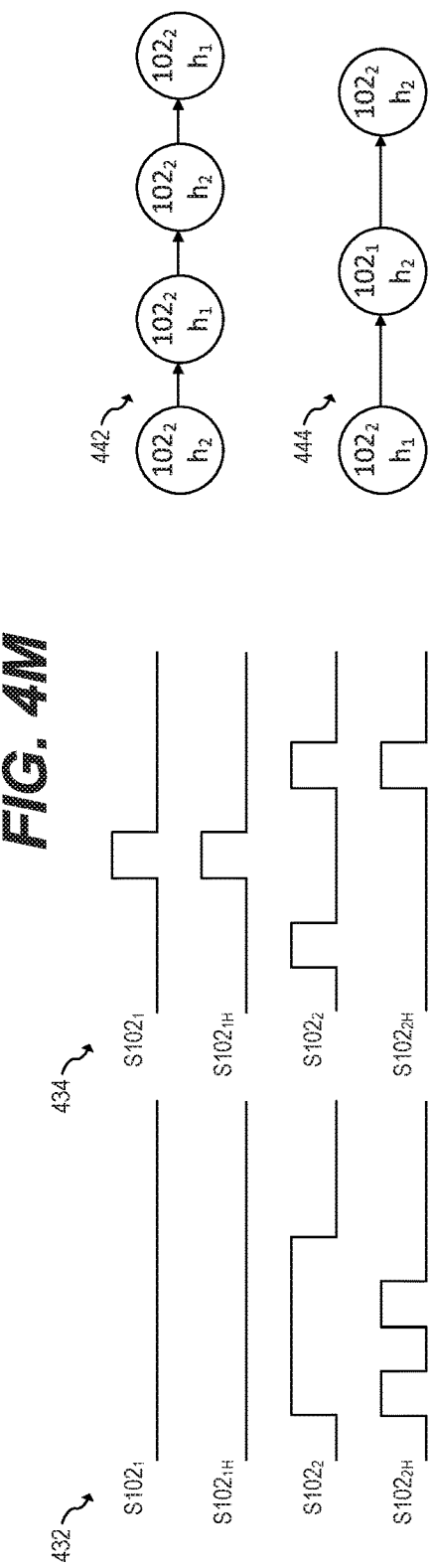

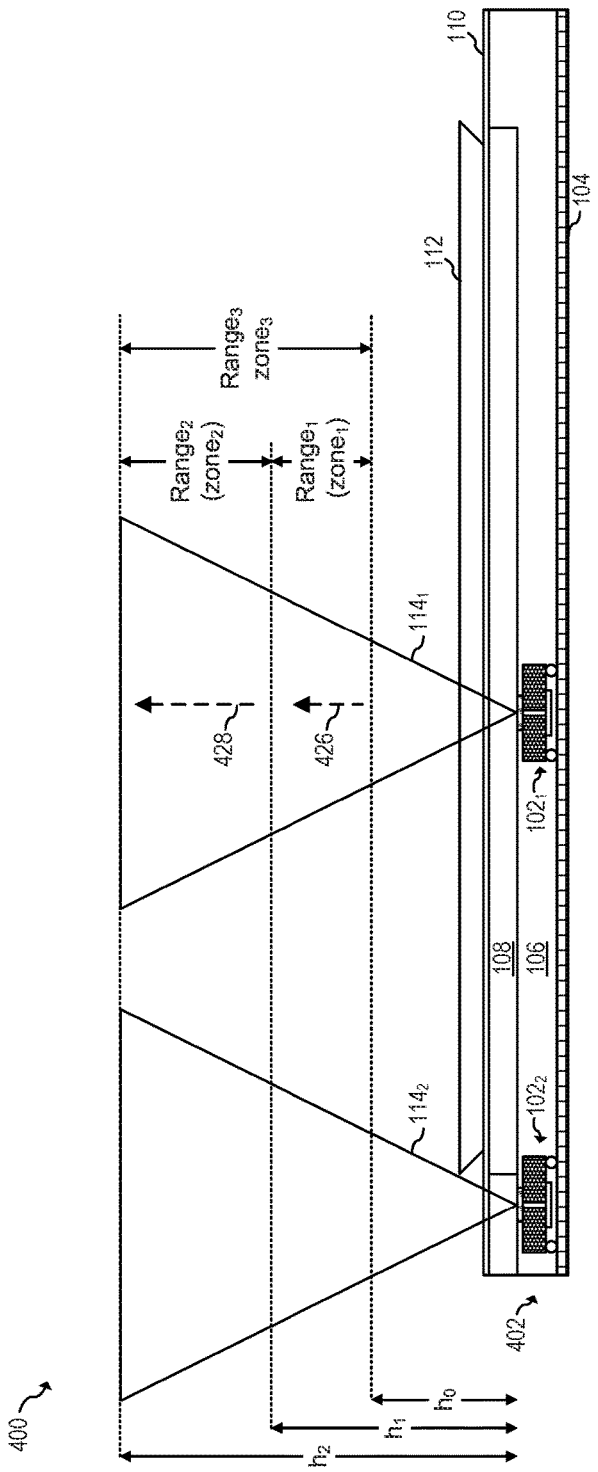
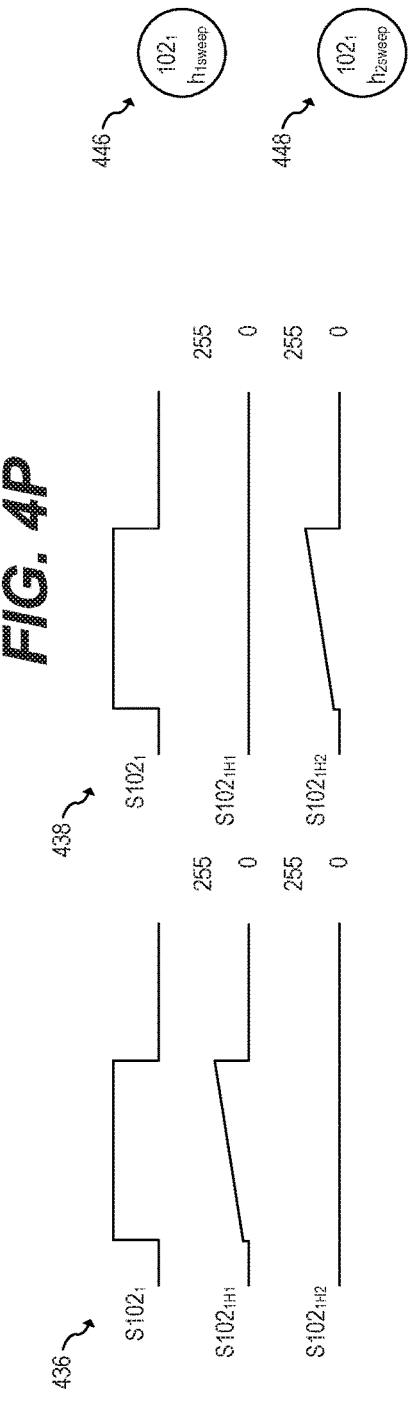
FIG. 4P
FIG. 4Q
FIG. 4R

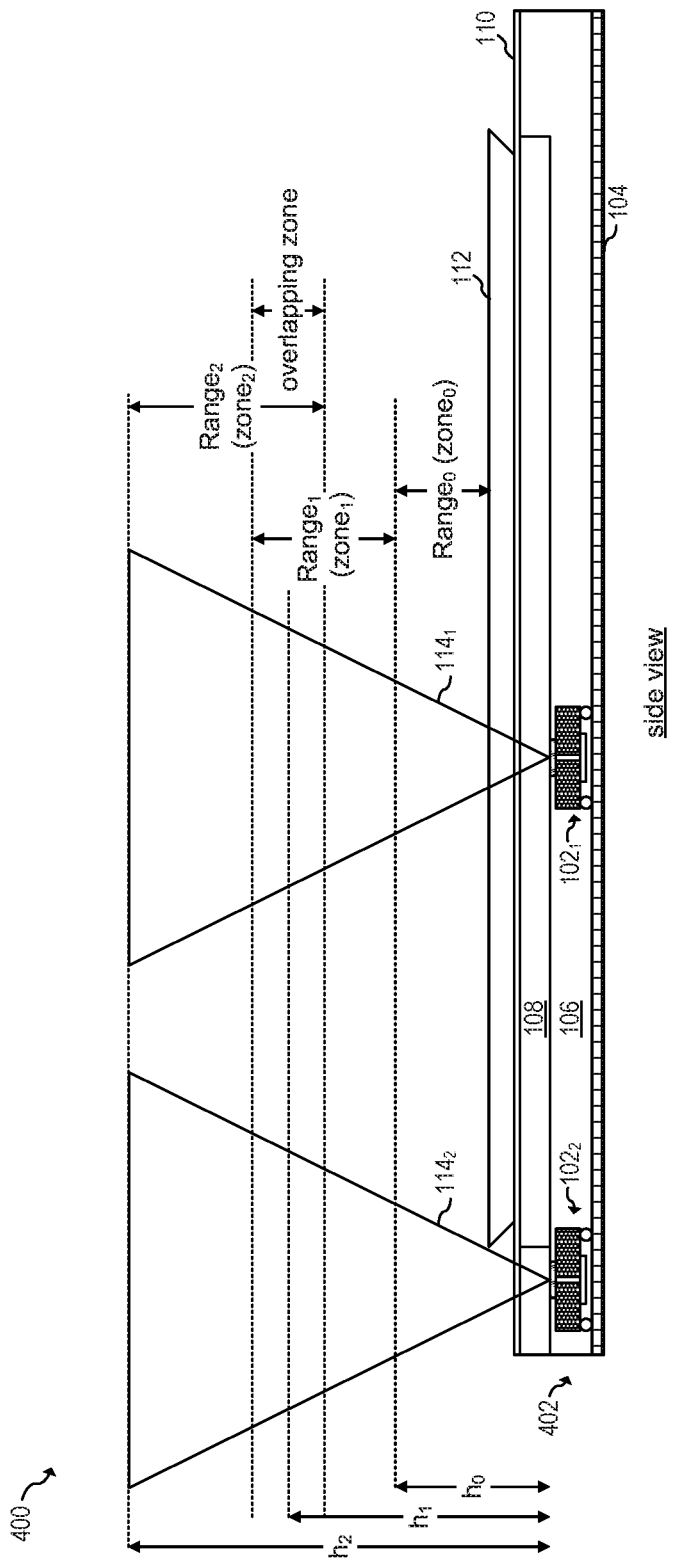

GESTURE DETECTION SYSTEM AND METHOD USING A RADAR SENSOR

CROSS-REFERENCE TO RELATED APPLICATIONS

This application is related to co-pending U.S. patent application Ser. No. 16/039,940, filed on Jul. 19, 2018, entitled "Gesture Detection System and Method Using Radar Sensors," and associated, which application is hereby incorporated herein by reference.

TECHNICAL FIELD

The present invention relates generally to an electronic system and method, and, in particular embodiments, to a gesture detection system and method using a radar sensor.

BACKGROUND

Many electronic devices exhibit one or more user interfaces. For example, a typical personal computer displays images on a screen and receives user commands from a keyboard and a mouse. Voice commands are also available in some devices, such as smartphones and other devices that include a virtual assistant.

Modern smartphones, tablets and laptops typically include a touchscreen that displays images and receives control information from a user based on touching the touchscreen. The use of touchscreens allows a user to interact directly with the information displayed on the screen instead of relying solely on traditional input devices, such as a keyboard and a mouse.

In addition to simple touch gestures, modern touchscreen interfaces are capable of recognizing multi-touch gestures when touching the screen with a stylus or one or more fingers. Touchscreen gestures such as rotating knobs, adjusting sliders, and changing the zoom of an image displayed on the screen are known in the art.

Some devices, such as some modern smartphones, have replaced keyboard and mouse inputs with a touchscreen interface. A virtual keyboard that is accessed via the touchscreen is used instead of a traditional keyboard. The mouse and other complex interactions are replaced with a variety of touchscreen gestures.

SUMMARY

In accordance with an embodiment, a controller is configured to be coupled to a millimeter-wave radar mounted on a device, where the millimeter-wave radar includes a field of view in a direction away from the device. The controller is configured to: detect a presence of an object in a first range zone of a plurality of range zones of the field of view, where each range zone of the plurality of range zones respectively corresponds to different distance ranges relative to the device, and where each range zone is associated with a respective command database; determine a gesture signature based on detecting the presence of the object in the first range zone of the field of view; and cause execution of a command chosen from the respective command database associated with the first range zone as a function of the gesture signature.

In accordance with an embodiment, a device includes: a screen; a millimeter-wave radar mounted on the device, where the millimeter-wave radar has a field of view; and a controller. The controller is configured to: detect a presence of an object in a first range zone of a plurality of range zones of the field of view, where each range zone of the plurality of range zones respectively corresponds to different distance ranges relative to the device, and where each range zone is associated with a respective command database; determine a gesture signature based on detecting the presence of the object in the first range zone of the field of view; and cause execution of a command chosen from the respective command database associated with the first range zone as a function of the gesture signature.

In accordance with an embodiment, a method includes: detecting a presence of an object in a first range zone of a plurality of range zones of a field of view of a millimeter-wave radar mounted on a device, the plurality of range zones respectively corresponding to different distance ranges relative to the device, where each range zone of the plurality of range zones is associated with a respective command database; determining a gesture signature based on detecting the presence of the object in the first range zone; choosing a command from the respective command database associated with the first range zone based on the determined gesture signature; and executing the command.

In accordance with an embodiment, a device includes: a screen; a plurality of millimeter-wave radars mounted on the device, where each millimeter-wave radar of the plurality of millimeter-wave radars has a field of view that includes one or more range zones; and a controller. The controller is configured to: detect a first presence of an object in a first range zone of a field of view of a first millimeter-wave radar; detect a second presence of the object in a first range zone of a field of view of a second millimeter-wave radar; determine a gesture signature based on detecting the first presence and the second presence; and execute a command based on the determined gesture signature

BRIEF DESCRIPTION OF THE DRAWINGS

For a more complete understanding of the present invention, and the advantages thereof, reference is now made to the following descriptions taken in conjunction with the accompanying drawings, in which:

FIG. 3A shows a cross-section view of a millimeter-wave radar of the millimeter-wave radar system of FIG. 1, according to an embodiment of the present invention;

FIGS. 3B and 3C show a top view and a bottom view of the millimeter-wave radar of FIG. 3A, according to an embodiment of the present invention;

FIG. 3D shows a schematic diagram of the millimeter-wave radar of FIG. 3A, according to an embodiment of the present invention;

FIGS. 4A-4C show a top view of a millimeter-wave radar system, as implemented in a smartphone and having two monostatic millimeter-wave radars 102, according to an embodiment of the present invention;

FIGS. 4D-4F illustrates a method of detecting a gesture by the millimeter-wave radar system of FIGS. 4A-4C, according to an embodiment of the present invention;

For example.

For example, FIGS. 4J-4L illustrate a method of detecting yet another gesture by the millimeter-wave radar system of FIGS. 4A-4C, according to an embodiment of the present invention;

FIGS. 4M-4O illustrate a method of detecting multi-height gestures by the millimeter-wave radar system of FIGS. 4A-4C, according to an embodiment of the present invention;

FIGS. 4P-4R illustrate another method of detecting multi-height gestures by the millimeter-wave radar system of FIGS. 4A-4C, according to an embodiment of the present invention;

FIG. 4S shows the millimeter-wave radar system of FIGS. 4A-4C having overlapping zones, according to an embodiment of the present invention;

Figure 1:
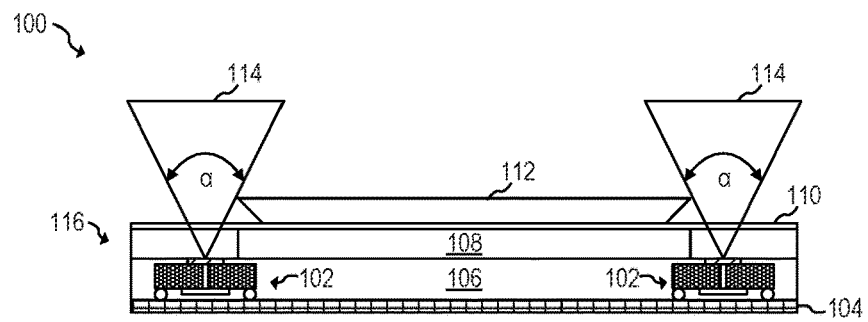
FIG. 1 shows a cross-section view of a millimeter-wave radar system, according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a device, such as a smartphone, having a touchscreen and one or more millimeter-wave radars for various types of three-dimensional gesture recognition. Embodiments of the present invention may be used with other types of three-dimensional gesture recognition as well as in other devices, such as tablets, laptops, televisions, display panels, automotive infotainment systems, devices having a screen without a touchscreen and devices without a screen. Some embodiments relate to a user interface based on multi coherent radar sensors. Some embodiments relate to a radar-based volume user interface.

In an embodiment of the present invention, gestures of an object, such as a human finger, are detected above a touchscreen of a smartphone by using millimeter-wave radars. In some embodiments, each millimeter-wave radar detects the presence or absence of the object in their respective field of view with respect to a reference clock or other timing reference. Each millimeter-wave radar may be implemented, for example, using a simple single radar transceiver having a directional antenna. The sequence of object detections by each millimeter-wave radar is mapped to a gesture signature that is associated with a particular command. In some embodiments, the distance (range) between the object making the gesture and the device may be considered when mapping the gesture to a gesture signature. In other embodiments, the distance between the object and the device is ignored.

In some embodiments, a user of the smartphone may advantageously interact with the smartphone to launch applications (apps) or perform other functions without touching the screen, or exiting or hiding the current app. Changing the volume, authenticating a user, app initiation, speed dial, superficial app control interface, and turning off the screen are non-limiting examples of such functions.

FIG. 1 shows a cross-section view of millimeter-wave radar system 100, according to an embodiment of the present invention. Millimeter-wave radar system 100 includes a plurality of millimeter-wave radars 102, and is implemented in device 116, which includes touchscreen 108. For instance, all or part of the millimeter-wave radars 102 are monostatic millimeter-wave radars.

As shown in FIG. 1, touchscreen 108 is disposed over molding compound 106. Some embodiments, such as embodiments implemented in a mobile phone, may have an air gap instead of molding compound 106. Glass no is disposed over touchscreen 108. Millimeter-wave radars 102 are disposed in printed circuit board (PCB) 104.

During normal operation, millimeter-wave radars 102 transmits one or more radar signals (not shown), such as chirps, towards their respective fields of view 114. The transmitted radar signals are reflected by objects (not shown) in fields of view 114. The objects in the field of view may include all or part of a hand, such as one or more human fingers, a stylus, or other objects, for example. The reflected radar signals (not shown), which are also referred to as the reflected signals or the echo signals, are detected by respective millimeter-wave radar 102, digitized, thereby generating echo data, and processed by a processor (not shown) to, for example, identify gestures made by a finger or other object.

Millimeter-wave radars 102 have respective fields of view 114 that are directed away from millimeter-wave radar system 100 so as to allow detection of objects in the vicinity of millimeter-wave radar system 100. The fields of view may extend, for example, up to 30 cm from millimeter-wave radars 102 at an angle α between 45° and 50° in a direction away from device 116. In some embodiments, field of view 114 extends farther than 30 cm, or closer than 30 cm and/or at an angle higher than 50° or lower than 45°. Although fields of view 114 are illustrated as a triangle in the cross-section view of FIG. 1, it is understood that fields of view 114 may have a generally cone-shaped configuration having a generally circular cross-section when seen in a top view (not shown in FIG. 1).

Touchscreen 108 has a field of view 112 that is very close to touchscreen 108. For example, touchscreen 108 may be implemented as a capacitive touchscreen having a field of view that extends within 1 cm of touchscreen 108.

Device 116 may be, for example, a smartphone, tablet, laptop, display panel, automotive infotainment system, television, or a wearable device having a display. In the examples that follow, device 116 is implemented as a smartphone for illustrative purposes. However, it is understood that other devices may be used instead of a smartphone.

Figure 2:
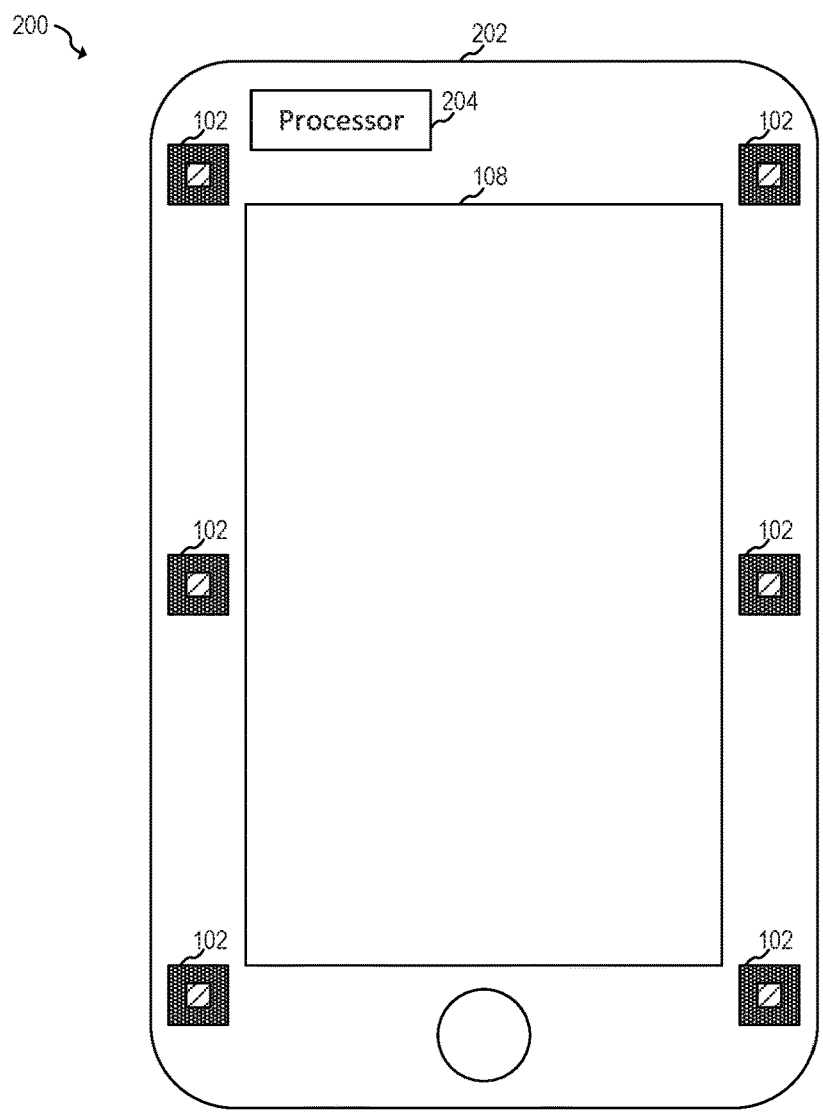
FIG. 2 shows a top view of the millimeter-wave radar system of FIG. 1, as implemented in a smartphone and having six monostatic millimeter-wave radars, according to an embodiment of the present invention.

FIG. 2 shows a top view of millimeter-wave radar system 200, as implemented in smartphone 202 and having six millimeter-wave radars 102, e.g. monostatic millimeter-wave radars 102, according to an embodiment of the present invention. Millimeter-wave radars other than monostatic may be used. Fields of view 112 and 114 and glass no are not shown in FIG. 2 for clarity purposes.

As shown in FIG. 2, millimeter-wave radar system 200 includes a plurality of millimeter-wave radars 102 and processor 204. Processor 204 is shown schematically in FIG. 2. It is understood that processor 204 may be implemented in any suitable portion of smartphone 202, such as beneath touchscreen 108, for example.

Processor 204 receives data from one or more millimeter-wave radars 102 and determines whether an object is present in respective fields of view 114. In some embodiments, processor 204 also determines the range (distance) of the detected object from the respective millimeter-wave radar 102.

In some embodiments, all of millimeter-wave radars 102 receive the same clock signal and operate based on the same reference clock. By operating using the same reference clock, it is possible to determine the time of detection of objects in respective fields of view 114, which allows detection of various gestures, as will be explained in greater detail below. Other synchronization methods may be used.

Processor 204 may be implemented as a general purpose processor, controller or digital signal processor (DSP), such as a low power general purpose microcontroller. In some embodiments, processor 204 may be implemented as a custom application specific integrated circuit (ASIC). In some embodiments, processor 204 includes a plurality of processors, each having one or more processing cores. In other embodiments, processor 204 includes a single processor having one or more processing cores. In some embodiments, processor 204, or a portion of processor 204 may be embedded in millimeter-wave radar 102.

Processor 204 may communicate with millimeter-wave radars 102 using known communication protocols, such as serial peripheral interface (SPI), inter-integrated circuit $I^2C$, inter-IC source (I2S) or others. Some embodiments, may use wireless communication protocols, such as Bluetooth or WiFi, for example. Other communication protocols, such as custom protocols or other standard communication protocols may also be used.

FIG. 3A shows a cross-section view of millimeter-wave radar 102, according to an embodiment of the present invention. Millimeter-wave radar 102 includes die 308, balls 306, high frequency laminate 304 and antenna 302. Millimeter-wave radar 102 may be implemented, for example, as described in U.S. Pat. No. 9,935,065, filed on Dec. 21, 2016, in U.S. Patent Publication No. 2016/0178730, filed on Nov. 30, 2015, and in U.S. Patent Publication No. 2018/0074173, filed on Nov. 30, 2015, the contents of which are incorporated herein by reference in their entirety.

As shown in FIG. 3A, millimeter-wave radar 102 is implemented in monostatic configuration, in which the same antenna 302 is integrated in the same package, and is used for the transmitter (TX) module and for the receiver (RX) module. Implementing millimeter-wave radar 102 in monostatic configuration has the advantage of having a small footprint (e.g., in a device or system), and allows a device or system to implement multiple millimeter-wave radars 102 for gesture detection. It is understood that other types of millimeter-wave radars, such as millimeter-wave radars implemented in bistatic configuration, may be used, according to embodiments of the present invention.

Antenna 302 is coupled to die 308, for instance using conductive pillar 303. In some embodiments conductive pillar 303 is part of antenna 302 and is made with the same material as antenna 302. In other embodiments, the antenna may be remotely fed, for instance through electromagnetic coupling.

High frequency laminate may be, for example, RO 4350 laminate from Rogers Corporation, Megtron 6 or 7 laminates from Panasonic, HL972 or HL872 laminates from Mitsubishi. Other high-speed laminates may also be used.

Balls 306 are used to connect die 308 with external circuits. Some embodiments may implement pads instead of balls. Other connectors may also be used.

Die 308 includes a millimeter-wave radar sensor circuit (not shown). The millimeter-wave radar sensor circuit may transmit and receive signals in the GHz range via antenna 302. For example, some embodiments may transmit and receive signals such as chirps in a band allocated around frequencies such as 95 GHz, 120 GHz, 140 GHz, and/or 240 GHz and/or other frequencies between about 95 GHz and about 240 GHz range. Other embodiments may transmit and receive signals such as chirps in the 20 GHz to 122 GHz range. Yet other embodiments may transmit and receive signals, such as chirps with frequencies above 240 GHz. Other frequencies and frequency ranges are also possible. By running at high frequencies, and by having the antenna integrated in the same package, the package and antenna size of millimeter-wave radar 102 may be reduced to allow a plurality of millimeter-wave radars 102 to be placed in the perimeter of a touchscreen, such as the touchscreen of a smartphone or wearable device.

In some embodiments, the millimeter-wave radar sensor circuit process the echo signals received by using band-pass filter (BPFs), low-pass filter (LPFs), mixers, low-noise amplifiers (LNAs), and intermediate frequency (IF) amplifiers in ways known in the art. The echo signals are then digitized using one or more analog-to-digital converters (ADCs) for further processing. Other implementations are also possible.

Millimeter-wave radar 102 is capable of detecting the presence of objects in field of view 114. As shown in FIG. 3A, the area of object detection varies based on the distance between the object and antenna 302. As shown, the diameter of coverage of field of view 114 may increase with height. For example, diameter $d_1$, which corresponds to distance $h_1$ to antenna 302, is smaller than diameter $d_2$, which corresponds to distance $h_2$ to antenna 302, where distance $h_2$ is larger than distance $h_1$.

In some embodiments, millimeter-wave radar 102 detects the presence or absence of objects in field of view 114 irrespective of the object's distance to the millimeter-wave radar 102. In other embodiments, millimeter-wave radar 102 detects the presence or absence of objects in a predetermined range (height), such as between 5 cm and 30 cm, while ignoring the detection of objects outside the predetermined range. For example, in some embodiments, millimeter-wave radar 102 determines the distance to the detected objects using range transformations, such as range FFT. The presence or absence of objects may be associated with a particular range. For example, an object may be detected if it is between distances $h_1$ and $h_2$. The object may be ignored (not detected) if the object is closer than distance $h_1$ or farther than $h_2$, even though the object is in field of view 114.

FIGS. 3B and 3C show a top view and a bottom view of millimeter-wave radar 102, according to an embodiment of the present invention. FIG. 3D shows a schematic diagram of millimeter-wave radar 102, according to an embodiment of the present invention.

As shown, millimeter-wave radar 102 includes die 308 and antenna 302. Die 308 includes millimeter-wave radar sensor circuit 309, controller 318, and interface circuit 324. Millimeter-wave radar sensor circuit 309 includes front-end RF circuit 314, and mixed signal circuit 316. Controller 318 includes digital block 320 and signal processing block 322.

RF circuit 314 is configured to transmit and receive radar signals (e.g., chirps). RF circuit 314 includes transmitter circuit 310, receiver circuit 312. RF circuit 314 is implemented in a monostatic configuration.

Transmitter circuit 310 and receiver circuit 312 may be implemented in any way known in the art. Mixed signal circuit 316 is configured to control RF circuit 514 to transmit signals (e.g., chirps), and to receive the echo signal. Mixed signal circuit 316 is also configured to translate the RF signals into digital signals that are then transmitted to controller 318.

Mixed signal circuit 316 may be implemented in any way known in the art. For example, in some embodiments, mixed signal circuit 316 includes one or more band-pass filters (BPFs), low-pass filters (LPFs), mixers, low-noise amplifier (LNA), intermediate frequency (IF) amplifiers, phase-locked loops (PLLs) and analog-to-digital converters (ADCs).

Controller 318 is configured to process the signals received from millimeter-wave radar sensor circuit 309 and transmit it to a processor (not shown in FIG. 3D), such as processor 204. Controller 318 may be implemented in any way known in the art, such as a general purpose controller or processor, ASIC, or any other implementation. Controller 318 typically includes digital block 320 for general control purposes (e.g., controlling millimeter-wave radar sensor circuit 309 and interface circuit 324) and a signal processing block 322 for processing the signals received from millimeter-wave radar sensor circuit 309. Digital block 320 may include a finite state machine (FSM).

Signal processing block 322 may be implemented with a digital signal processor (DSP). In some embodiments, signal processing block 322 implements a portion or all of processor 204. In other embodiments, signal processing block 322 is not implemented and, instead, the raw data received from millimeter-wave radar sensor circuit 309 is sent to processor 204 for further processing. In some embodiments, millimeter-wave radar sensor circuit 309 may be implemented as a frequency modulated continuous wave (FMCW) sensor.

Interface circuit 324 is configured to transmit data from controller 318 to processor 204. Interface 324 may be implemented in any way known in the art. For example, interface 324 may be implemented for WiFi or Bluetooth communications, SPI, and I$^2$C. Other communication protocols, including low power communication protocols and low data rate communication protocols may be used.

Figure 4C:
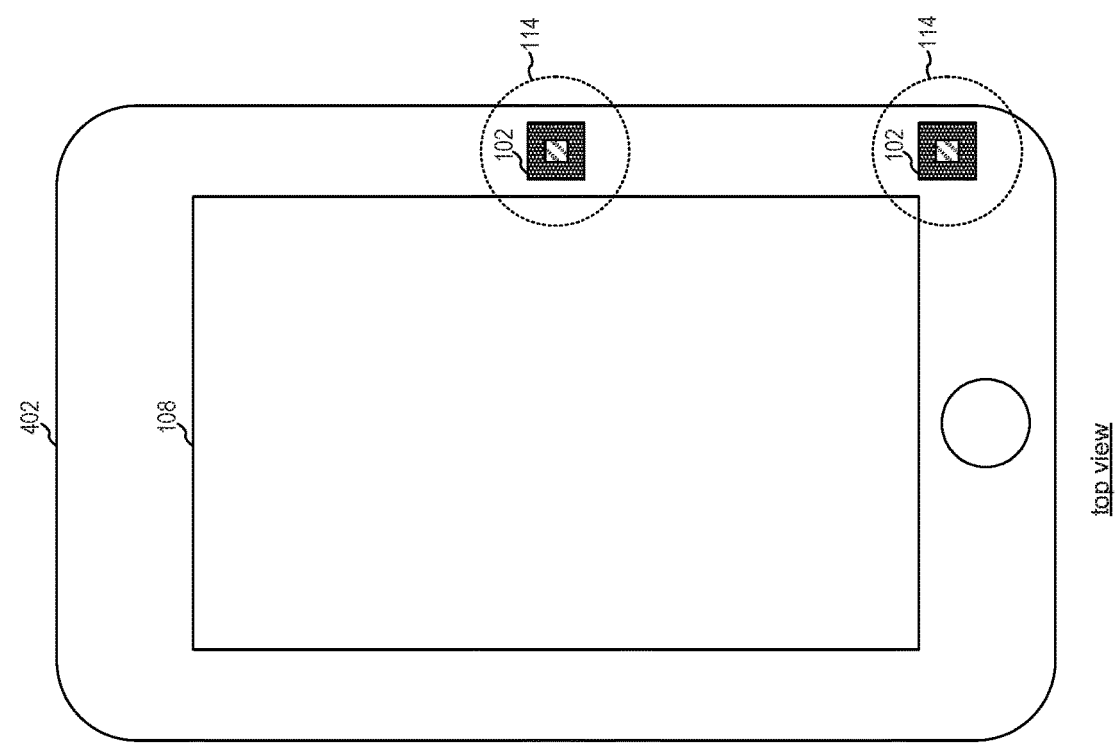
Figure 4B:
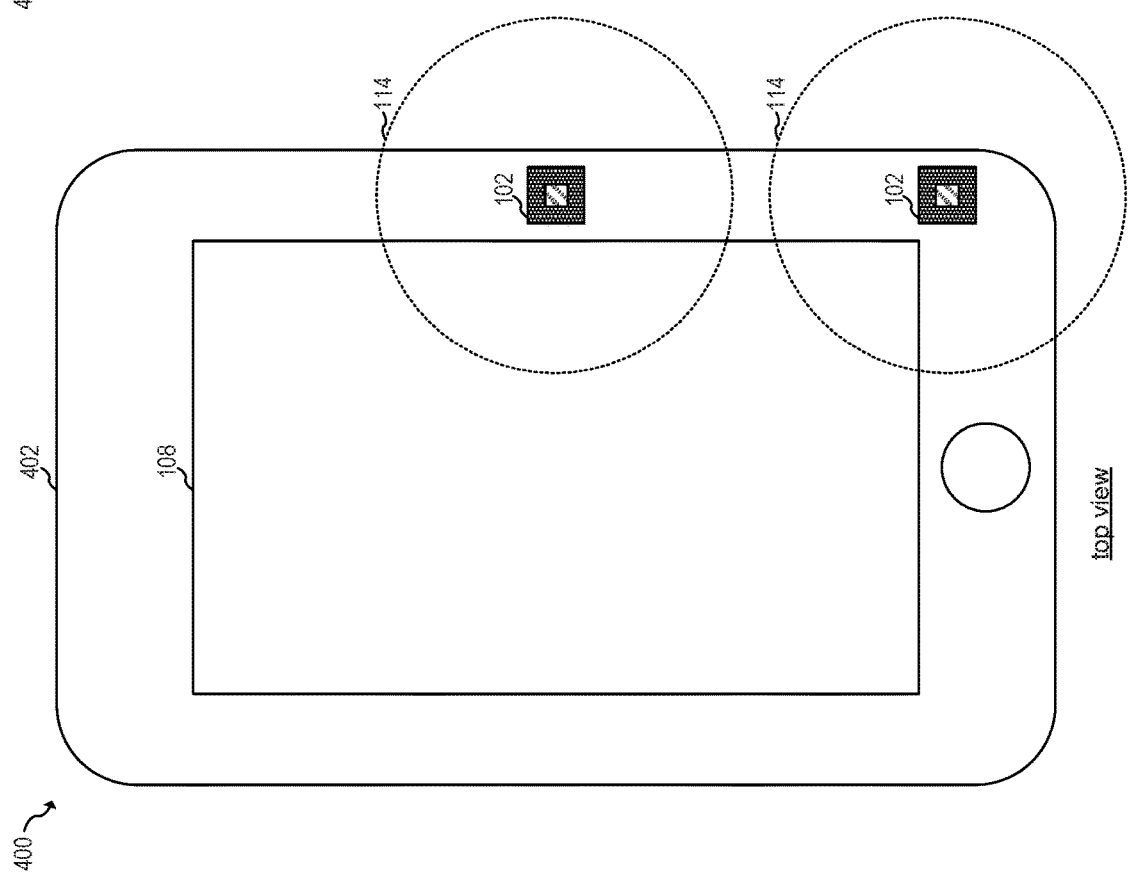

FIGS. 4A-4C show a top view of millimeter-wave radar system 400, as implemented in smartphone 402 and having two monostatic millimeter-wave radars 102, according to an embodiment of the present invention. FIGS. 4A, 4B, and 4C show fields of view 114 at heights $h_1$, $h_2$, and $h_o$, respectively. Some embodiments may be implemented with millimeter-wave radars in other configurations, such as bistatic millimeter-wave radars.

In some embodiments, two-dimensional gestures of an object, such as all or part of a human hand, e.g. one or more fingers, are detected above a touchscreen of a smartphone by using a plurality of millimeter-wave radars synchronized to a time reference. In some embodiments, each c millimeter-wave radar behaves as a detection pixel indicating whether an object is detected (on) or not detected (off) in a predetermined range or range zone of its respective field of view. The sequence of detections is then associated with a gesture signature. A command is executed in the smartphone based on the gesture signature detected.

By synchronizing each, e.g. monostatic, millimeter-wave radar to the same time reference, such as the same clock, it is possible to identify the sequence of object detection in respective fields of view and perform gesture recognition without using beamforming techniques or other math-intensive signal processing. For example, FIGS. 4D-4F illustrate a method of detecting gesture 405 by millimeter-wave radar system 400, according to an embodiment of the present invention.

During normal operation, each millimeter-wave radar 102 monitors and detects objects in the respective field of view 114. When an object, such as a human finger, is swiped, for example, at a height $h_1$ (or range $zone_1$), in a two-dimensional motion that crosses from first fields of view $114_1$ to second field of view $114_2$, the finger is detected at different times by each millimeter-wave radar 102.

As shown by FIG. 4E, the object enters field of view $114_1$ at time $t_1$, exits field of view $114_1$ at time $t_2$, enters field of view $114_2$ at time $t_3$, and exits field of view $114_2$ at time $t_4$. Processor 404 may use either the entering times $t_1$ and $t_3$, the exit times $t_2$ and $t_4$, the holding times $\Delta t_{1\_2}$ and $\Delta t_{3\_4}$, the separation time $\Delta t_{2\_3}$, or any combination thereof, to determine a gesture. For example, based on timing diagram 406, processor 404 may determine gesture signature 408, which is associated with gesture 405, as a first object detection by monostatic millimeter-wave radar $102_1$ and a second object detection by millimeter-wave radar $102_2$ after the first object detection.

Entering and exiting fields of views 114 may be determined using radar signal processing techniques, such as signal conditioning and filtering to remove noise and false object detections and ranging transforms, such as range FFT to determine the height (range) or range zone of the detection.

As shown by FIG. 4F, gesture 405 may be associated with gesture signature 408. In some embodiments, gesture 405 is only associated with gesture signature 408 if the gesture 405 occurs at height $h_1$. In other embodiments, gesture 405 is only associated with gesture signature 408 if gesture 405 occurs at a range zone (e.g., range zone 1) that includes height $h_1$. In yet other embodiments, gesture 405 is associated with gesture signature 408 regardless of the range at which gesture 405 is performed.

Gesture signature 408 may be associated with a particular command. In some embodiments, the association of gesture signatures may change depending on the state of the smartphone. For example, when smartphone 402 is in sleep mode, detection of gesture signature 408 may cause the display of touchscreen 108 to turn on. When smartphone 402 has the display on, detection of gesture signature 408 may cause smartphone 402 to take a picture, for example. The association between particular gestures and particular commands is customizable in some embodiments. Some embodiments exhibit context-based gesture recognition, in which a particular gesture is associated with a particular command only if a particular application is running in smartphone 402. Other customization options are also possible.

In some embodiments, a watchdog timer (not shown) is used so as to prevent gesture recognition if the time between the first object detection and the second object detection is too long or too short. For example, in some embodiments, a gesture is ignored if the time between object detections is longer than 1 second. In some embodiments, a gesture is ignored if the time between object detections is shorter than 10 ms. Other time thresholds are also possible.

The watchdog timer may be implemented, for example, by processor 404. Other implementations are also possible.

In some gestures, the object may enter field of view $114_1$ at a first height (e.g., $h_1$), and enter field of view $114_2$ at a second height (e.g., $h_2$). In some embodiments, processor 404 may ignore the difference in heights and may detect the same signature (e.g., gesture signature 408) regardless of the height of the object detection. In other embodiments, gesture signature 408 may be detected only if the object detection occurs within a predetermined range zone (e.g., between $h_1$ and $h_2$). For example, processor 404 may ignore any gesture occurring at a height $h_o$ or lower. Ignoring gestures occurring very close to touchscreen 108 (e.g., at a height $h_o$ or lower), has the advantage of avoiding triggering commands when a user is holding smartphone 402 and interacting with touchscreen 108 in a normal manner. In some embodiments, height $h_o$ is between 2 cm and 5 cm. A different height may be used. In some embodiments height $h_o$ is customizable and/or changes dynamically based on which application is running in smartphone 402.

Ignoring gestures may be triggered by events external to the millimeter-wave radar system. For example, in some embodiments, gestures may be ignored if an object is in contact with touchscreen 108.

In some embodiments, fields of view $114_1$ and $114_2$ may overlap. In such embodiments, predetermined priority rules may be used to determine to which millimeter-wave radar 102 the detection of the object is associated. The predetermined rules may be, for example, that in case of conflict, the detection should always be associated with millimeter-wave radar $102_1$. Other predetermined priority rules may be used. In some embodiments, the predetermined priority rules may be changed or customized by a user either dynamically, during a configuration mode and/or may be context-based (e.g., based on the state of smartphone 402). In some embodiments, processor 404 may ignore the gesture if a conflict arises.

Processor 404 may detect gestures that involve multiple detections by millimeter-wave radars 102. For example, FIGS. 4G-4I illustrate a method of detecting gesture 410 by millimeter-wave radar system 400, according to an embodiment of the present invention.

Figure 4H:
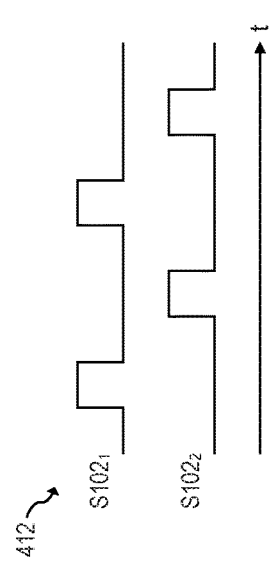
FIGS. 4G-4I illustrate a method of detecting another gesture by the millimeter-wave radar system of FIGS. 4A-4C, according to an embodiment of the present invention.
Figure 4I:
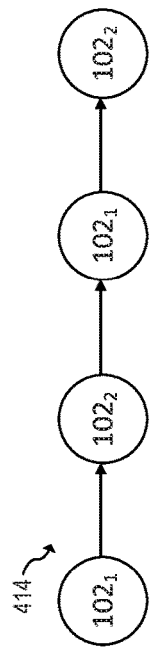
Figure 4G:
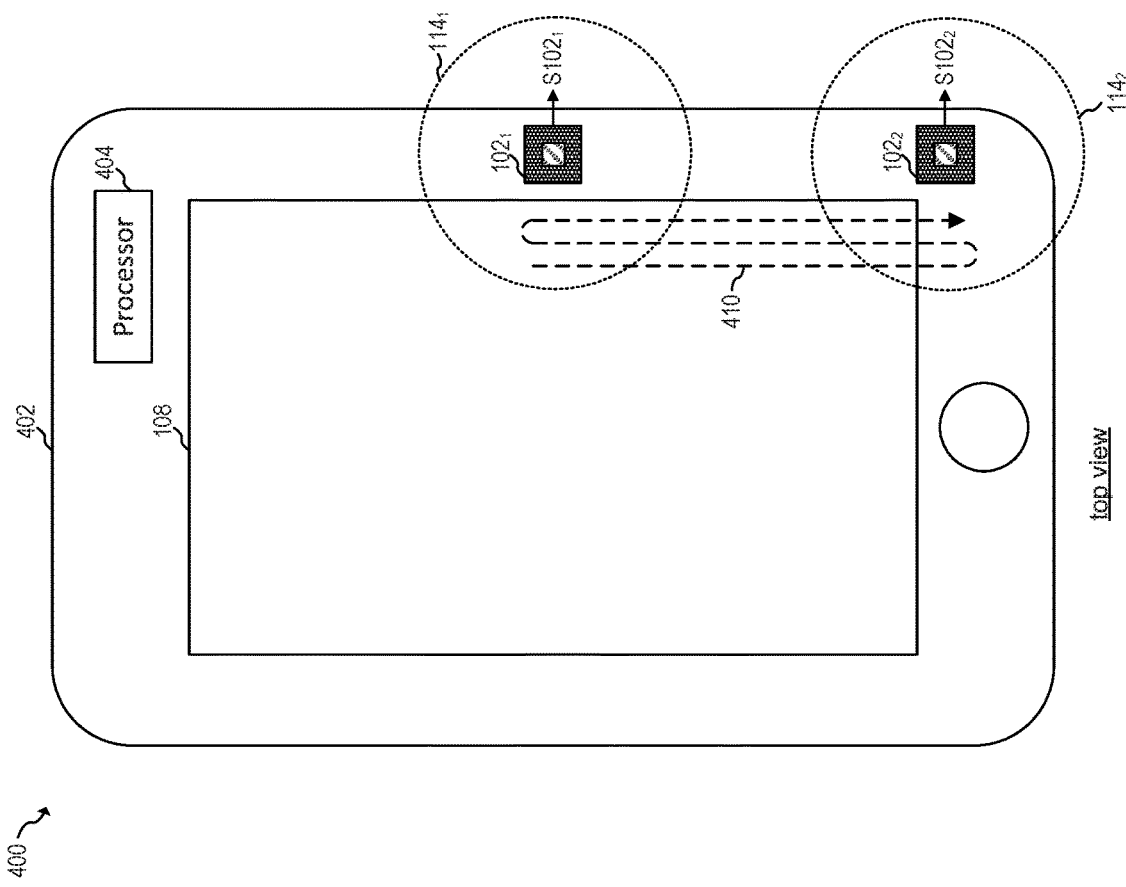

As shown by FIGS. 4G and 4H, the detected object travels between fields of view $114_1$ and $114_2$, as illustrated by gesture 410 and timing diagram 412. FIG. 4I shows the detected gesture signature 414 associated with gesture 410.

Processor 404 may detect gestures that involve detections of objects at multiple heights. For example, FIGS. 4J-4L illustrate a method of detecting gesture 416 by millimeter-wave radar system 400, according to an embodiment of the present invention.

As shown by FIGS. 4J-4L, processor 404 may associate gesture 416, which travels from field of view $1114_1$ at height $h_1$ to field of view $114_2$ at height $h_2$, with gesture signature 420. It is understood that, in some embodiments, height $h_1$ and $h_2$ may correspond to height range 1 ($zone_1$) and height range 2 ($zone_2$). For example, in some embodiments, $zone_2$ may correspond to heights between 20 cm and 30 cm while $zone_1$ may correspond to heights between 10 cm and 20 cm. Other heights and height ranges may be used.

In some embodiments, processor 404 may associate gesture 416 with gesture signature 408 (by ignoring the height of the detection). In some embodiments, the gesture signature associated with gesture 420 may change based on the state of smartphone 402, for example.

As shown in FIG. 4K, signals $S102_{1H}$ and $S102_{2H}$ are low if the object detection occurred at height $h_1$ and are high if the object detection occurred at height $h_2$. Other signal encoding schemes, such as opposite polarity, may be used.

In some embodiments, two-dimensional (vertical) gestures may be detected by using height (range) information. For example, some embodiments may detect gestures that involve a trajectory of an object getting closer to or further from a particular millimeter-wave radar 102. In some embodiments, the vertical gesture is tracked by detecting transitions between zones (e.g., between $zone_1$ and $zone_2$) of the same millimeter-wave radar 102. In some embodiments, the gesture is tracked within a single zone (e.g., $zone_1$).

Some embodiments may determine which command to execute in smartphone 402 based on the zone of the detection of the gesture.

In some embodiments, detection of three-dimensional gestures may be achieved by combining detection of one or more millimeter-wave radars with height information. For example, FIGS. 4M-4O illustrate a method of detecting multi-height gestures by millimeter-wave radar system 400, according to an embodiment of the present invention. As shown in FIGS. 4M-4O, gesture 422 is a gesture of an object that has a trajectory with different zones ($zone_1$ and $zone_2$) inside the same field of view (e.g., two-dimensional trajectory in the vertical direction). Gesture 422 may be tracked by detecting transitions between zones (zone1 and zone2). Some embodiments may track gesture 422 by tracking the trajectory within the zones ($zone_1$ and/or $zone_2$).

Gesture 424 is a gesture of an object that travels between different fields of views and different ranges in a three-dimensional motion. As shown, the presence of an object in a particular range may be associated with a corresponding range zone pixel.

Gesture signatures may be mapped with specific detections of millimeter-wave radars 102 in specific range zones. For example, processor 404 may map (associate) gestures 422 and 424 with gesture signatures 442 and 444, respectively, as shown by FIGS. 4M-4O. For example, gesture signature 422 is mapped to gesture 442, which is associated with a transition from $zone_2$ of field of view $114_2$, to $zone_1$ of field of view $114_2$, to $zone_2$ of field of view $114_2$, to $zone_1$ of field of view $114_2$. Gesture signature 424 is mapped to gesture 444, which is associated with a transition from $zone_1$ of field of view $114_2$, to $zone_2$ of field of view $114_1$, to $zone_2$ of field of view $114_2$.

In some embodiments, signals $S102_{1H}$ and $S102_{2H}$ may have more than 1 bit, (e.g., 8 bits, 10 bits, 12 bits, 14 bits, 16 bits, 32 bits, etc.) where the digital value represents the height of the object detection. In such embodiments, processor 404 may determine the gesture signature based on the trajectory of the object as well as on the range zone in which the gesture was detected. For example, FIGS. 4P-4R illustrate another method of detecting multi-height gestures by millimeter-wave radar system 400, according to an embodiment of the present invention.

As shown in FIG. 4P, gesture 426 is the gesture of an object (e.g., a finger) that has a trajectory from a lower range of zone1 of field of view $114_1$ to a higher range of $zone_1$ of field of view $114_1$. As shown by timing diagram 436 of FIG. 4R, processor 404 may detect the sweep in height in $zone_1$ of field of view $114_1$ by an object and generate signal $S1021H_1$ proportional to the range. As shown, gesture 426 may be associated with an analog or digital signal, such as shown by signal $S102_{1H1}$ of timing diagram 436, and may be mapped to gesture signature 446, as shown by FIG. 4R. Such gesture may be used, for example, to control (e.g., increase) the volume of the smartphone when music is playing. In some embodiments, such gesture over the smartphone may be used to adjust the volume of another device, such as a television or a sound system.

A similar gesture 428 occurring in $zone_2$ of field of view $114_1$ may be detected by processor 404, which may generate a signal, such as shown $S102_{1H2}$ of timing diagram 438, and may be mapped to gesture signature 448. Gesture signature 448 may be used, for example, to control (e.g., increase) the brightness of the display of touchscreen 108.

As shown, gesture signatures may be associated to different commands based on the range zone of detection (e.g., $zone_1$ or $zone_2$ in this example). In some embodiments, gestures 426 and 428 may be mapped to the same gesture signature (not shown) associated with $zone_3$. In such embodiments, the same command may be executed for gesture 426 or 428.

In some embodiments, processor 404 may reconfigure how many zones and the zone limits based on user inputs or the state of smartphone 402. In some embodiments, a particular zone configuration may be associated with a subset of millimeter-wave radars 102 while a different zone configuration may be associated with another subset of millimeter-wave radars 102.

In some embodiments, millimeter-wave radar $102_1$ may stream to processor 404 digital values of signal $S102_{1H}$ when gesture signature 446 is detected. In other embodiments, only the starting and ending values of the sweep are transferred to processor 404. Other implementations are also possible.

In some embodiments, some of the range zones may overlap. For example, FIG. 4S shows millimeter-wave radar system 400 with overlapping zones, according to an embodiment of the present invention. Having overlapping zones allow each zone to be larger, thereby increasing the tolerance for gesture recognition.

When detection occurs in an overlapping region, rules for resolving overlapping conflict may be used. In some embodiments, the rules may be dynamically changed such as based on the state of smartphone 402 or via user customization. In other embodiments, the rules are fixed.

In some embodiments, the zone thresholds, the amount of overlap, the zone-overlapping rules, and the number of zones may be dynamically changed by a human user and/or the state of smartphone 402. For example, in some embodiments, gestures detected in $zone_o$ may be ignored. When smartphone 402 is in sleep mode, presence has highest priority and the particular zone in which the object was detected (e.g., $zone_1$ or $zone_2$) is ignored. When smartphone 402 is not in sleep mode, gestures occurring in non-overlapping regions of $zone_1$ and $zone_2$ are associated with $zone_1$ and $zone_2$ detections, respectively. When no app is active in smartphone 402, gestures detected in the overlapping zone are associated with $zone_1$. When an app is active, gestures detected in the overlapping zone are associated with $zone_2$. Other rules may also be used.

In some embodiments, all of millimeter-wave radars 102 have the same zone configuration. In other embodiments, each millimeter-wave radar 102 has an independent zone configuration, which may be similar or different than zone configurations of other millimeter-wave radars 102.

Some embodiments may provide signals $S102_x$ and $S102_{xH}$ to processor 404 via dedicated traces in a PCB. Other embodiments may use communication protocols, such as SPI, I$^2$C, or others, to provide the information to processor 404.

As shown by FIGS. 4A-4R, millimeter-wave radar system 400 includes two millimeter-wave radars 102 ($102_1$ and $102_2$) disposed at the center right and at the bottom right portion of smartphone 402 and is capable of detecting various three-dimensional gestures. The arrangement illustrated in FIGS. 4A-4R has the advantage of detecting gesture signatures so as to provide half-screen (or quarter screen, depending on the height) control. Gestures that may be detected including vertical movements (swipe up or down) as well as height swipes (in a single millimeter-wave radar or between millimeter-wave radars). Such gestures may advantageously be used for functions such as scrolling, app initiation, volume control, speed dials, user authentication, superficial app control, among others. In some embodiments, such functions may be dynamically changed based on the state of smartphone 402 (e.g., in a context-based manner) and may be customized by a user and/or a device manufacturer.

Figure 5:
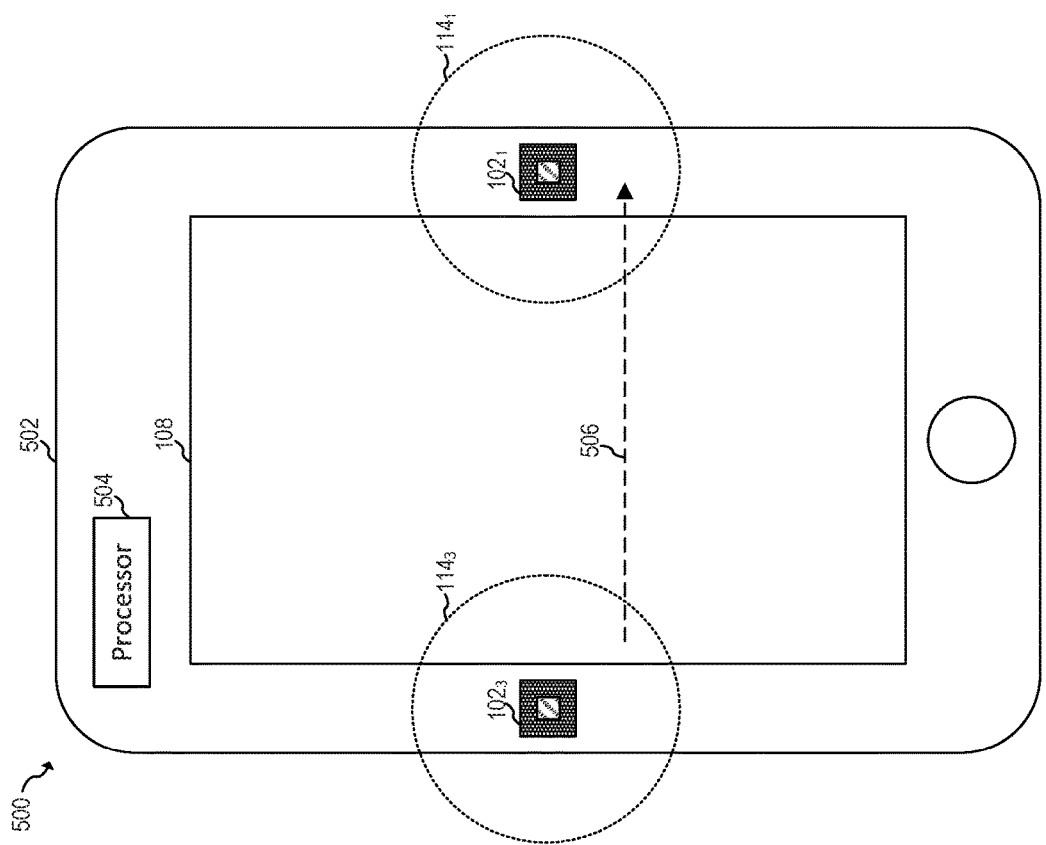
FIG. 5 shows a top view of a millimeter-wave radar system having two millimeter-wave radars, according to an embodiment of the present invention.

Millimeter-wave radar systems that include two millimeter-wave radars may be arrange in a manner different than shown in FIGS. 4A-4R. Different arrangements may allow for different gestures recognition in different areas of the smartphone. For example, FIG. 5 shows a top view of millimeter-wave radar system 500 having two millimeter-wave radars 102, according to an embodiment of the present invention. Some embodiments may be implemented with monostatic millimeter-wave radars. Other embodiments may be implemented with millimeter-wave radars in other configurations, such as bistatic millimeter-wave radars. As shown by FIG. 5, processor 504 may detect horizontal gestures, such as gesture 506. Millimeter-wave radar system 500 may also detect gestures based on height and/or multiple detections.

Figure 6A:
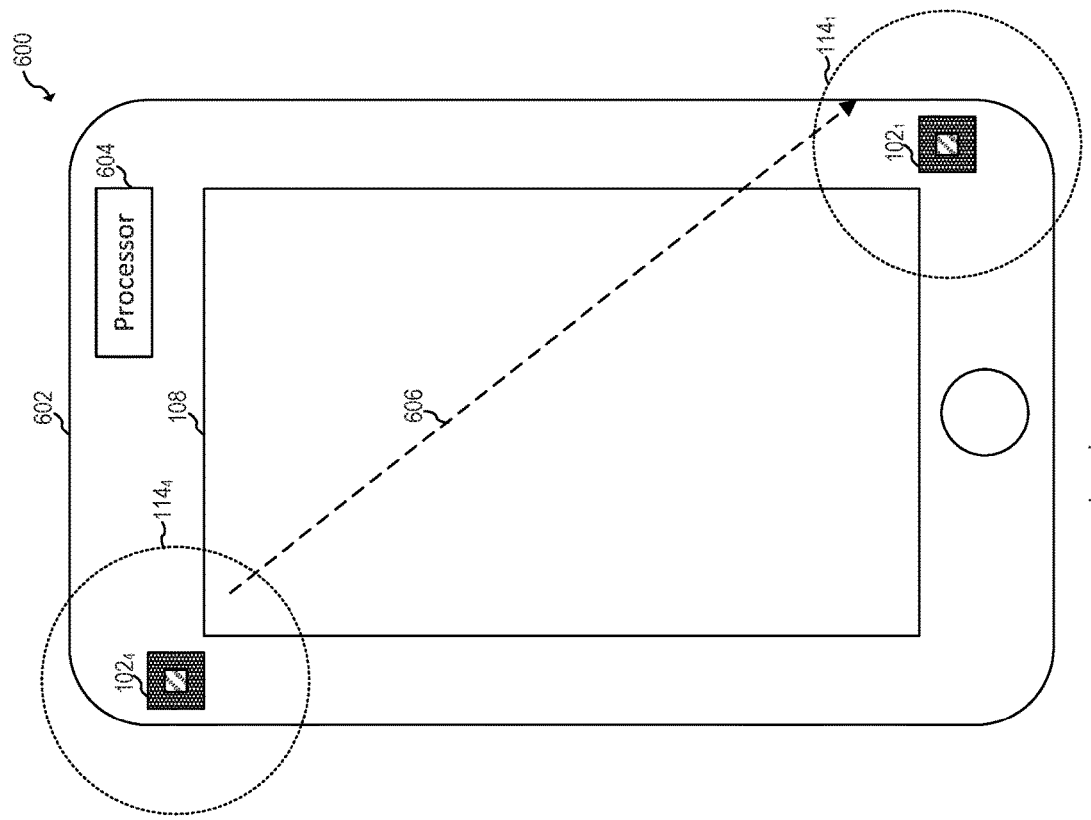
FIGS. 6A-6C show a top view of millimeter-wave radar system 600 having two millimeter-wave radars and associated gesture signatures, according to an embodiment of the present invention.
Figure 6B:
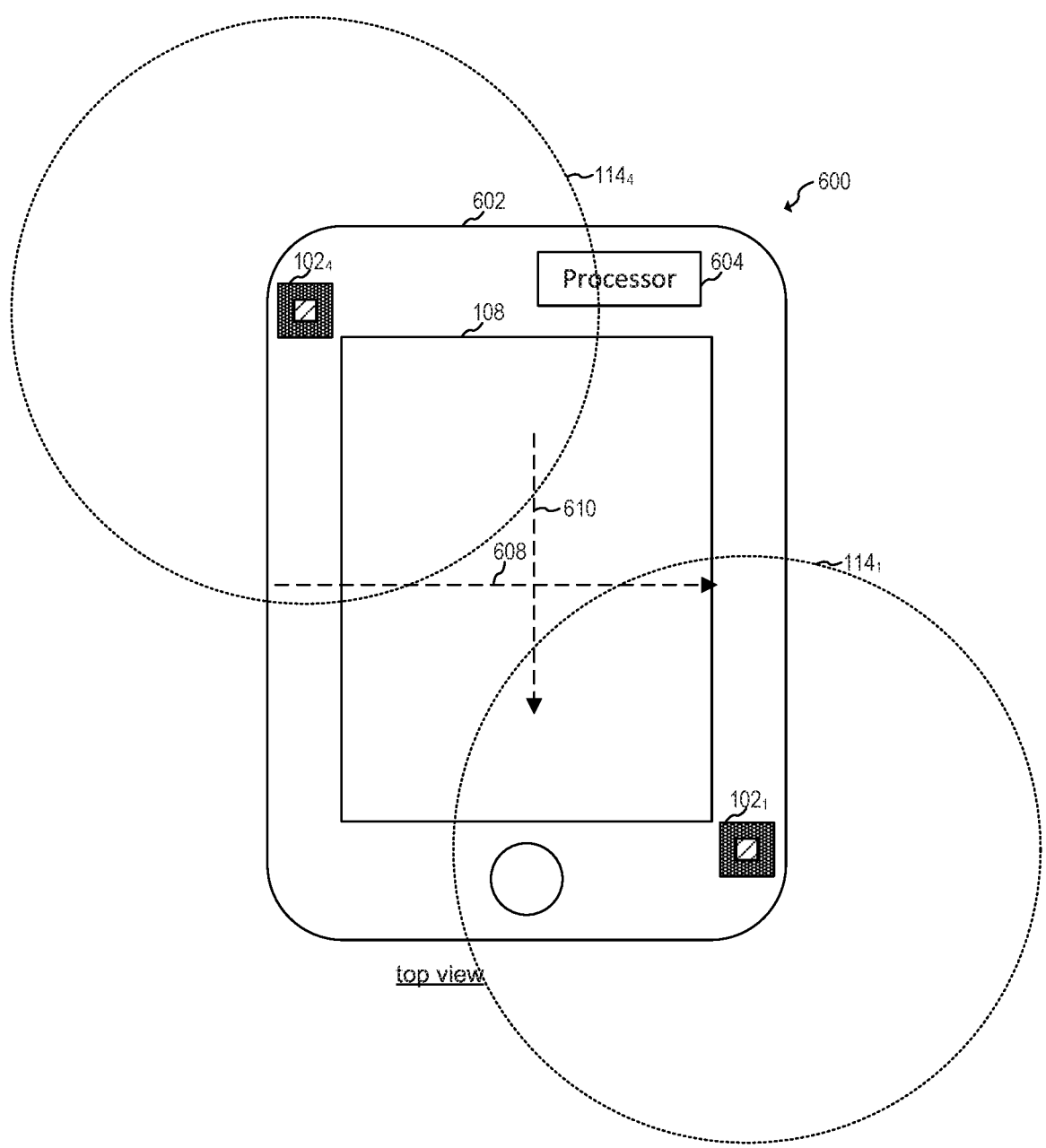
Figure 6C:
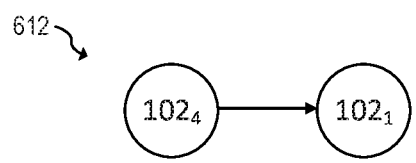

FIGS. 6A and 6B show a top view of millimeter-wave radar system 600 having two millimeter-wave radars 102, according to an embodiment of the present invention. Some embodiments may be implemented with millimeter-wave radars in monostatic configuration. Other embodiments may be implemented with millimeter-wave radars in other configurations, such as in bistatic configuration. As shown by FIG. 6A, processor 604 may detect diagonal gestures, such as gesture 606. As shown by FIG. 6B, depending on the height and size of smartphone 602, processor 606 may also detect horizontal gestures, such as 608 and 610. Gestures 606, 608 and 610 may be mapped to the same gesture signature 612, as shown in FIG. 6C. Millimeter-wave radar system 600 may also detect gestures based on height and/or multiple detections.

Figure 7:
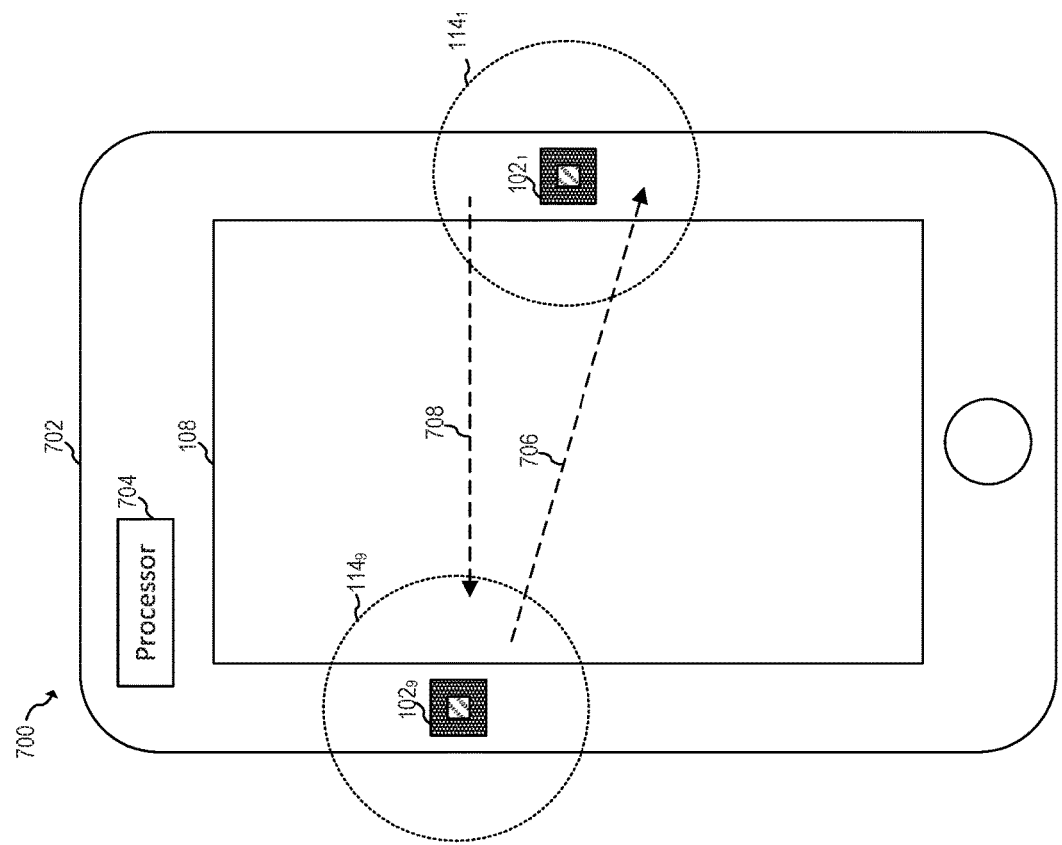
FIG. 7 shows a top view of a millimeter-wave radar system having two monostatic millimeter-wave radars, according to another embodiment of the present invention.

Some embodiments may dispose the millimeter-wave radars 102 in other locations within the embodiment device. For example, FIG. 7 shows a top view of millimeter-wave radar system 700 having two millimeter-wave radars 102, according to an embodiment of the present invention. Some embodiments may be implemented with millimeter-wave radars in monostatic, bistatic, or other configurations. As shown by FIG. 7, processor 704 may detect diagonal gestures, such as gesture 706, as well as horizontal gestures, such as gesture 708. Millimeter-wave radar system 700 may also detect gestures based on height and/or multiple detections.

As shown by FIGS. 4A-4R, 5, 6A-6C, and 7, a millimeter-wave radar system having two (e.g., monostatic) millimeter-wave radars may be used for two-point pixel gesture recognition. In other words, each of the millimeter-wave radars may be associated with a point that is either on (object detected) or off (object not detected), and patterns (gesture signatures), such as shown by FIGS. 4F, 4I, 4O, and 6C may be associated with each pixel (radar). Two-pixel patterns where the pixels include range information, such as shown by the patterns of FIGS. 4L and 4R, are also possible.

Figure 8A:
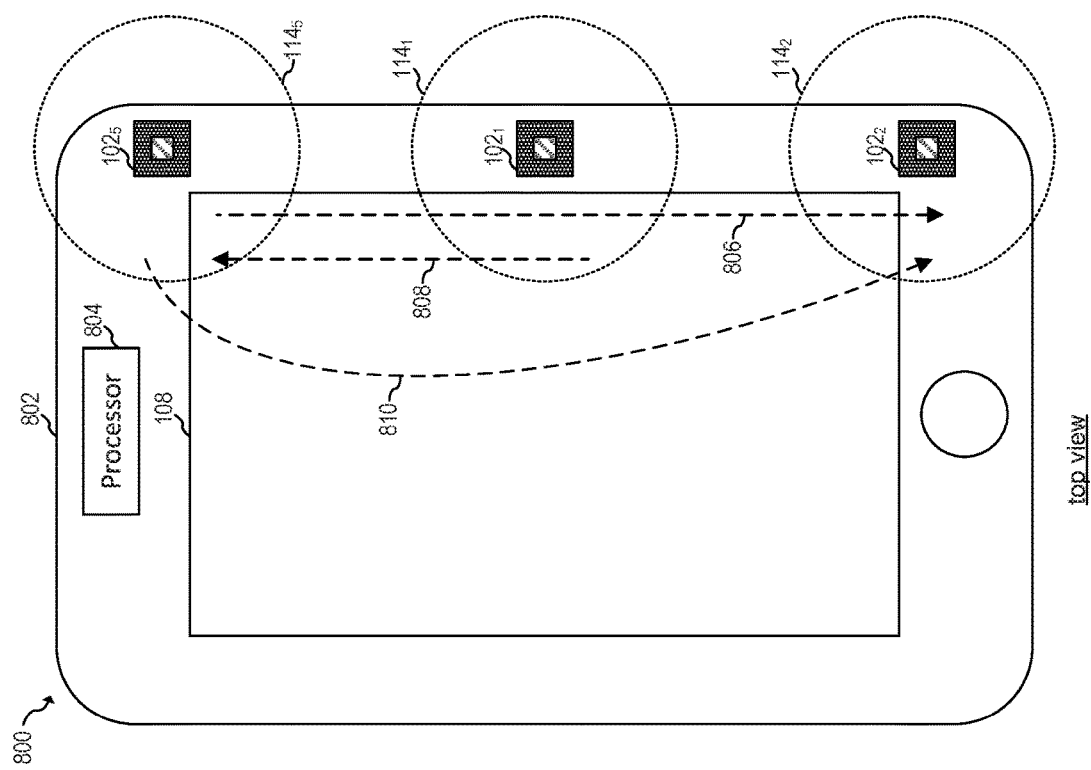
FIGS. 8A and 8B show possible gestures and their respective gesture signatures of a millimeter-wave radar system having three millimeter-wave radars, according to an embodiment of the present invention.
Figure 8B:
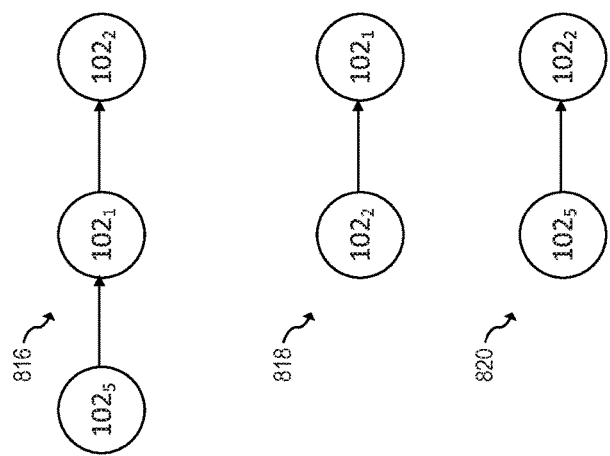

Millimeter-wave radar systems having more than two millimeter-wave radars are also possible. Advantages of some embodiments that include more than two millimeter-wave radars include the capability of additional gesture recognition and multi-pixel (e.g., three, four, five, six or more pixels) pattern recognition (where each monostatic millimeter-wave radar represents a pixel). For example, FIGS. 8A and 8B show possible gestures 806, 808 and 810, and their respective gesture signatures 816, 818 and 820, of millimeter-wave radar system 800 having three millimeter-wave radars 102, according to an embodiment of the present invention. Some embodiments may be implemented with millimeter-wave radars in monostatic, bistatic, or other configurations.

Gesture 806 correspond to an object having a trajectory from field of view $114_5$ to field of view $114_2$ passing through field of view $114_1$ of millimeter-wave radar $102_1$, as shown by gesture signature 816 of FIG. 8B. Gesture 808 correspond to an object having a trajectory from field of view $114_1$ to field of view $114_5$, as shown by gesture signature 818 of FIG. 8B. Gesture 810 correspond to an object having a trajectory from field of view $114_5$ to field of view $114_2$ without passing through field of view $114_1$ of millimeter-wave radar $102_1$, as shown by gesture signature 820 of FIG. 8B.

As also shown by FIGS. 8A and 8B, the absence of detection of an object in a field of view may also determine which gesture is performed. For example, the difference between gestures 806 and 810 is the absence of detection of the object by millimeter-wave radar $102_1$, as shown by gesture signatures 816 and 820.

As shown, millimeter-wave radar system 800 may provide half-screen, quarter screen, or full screen control. Millimeter-wave radar system 800 may also detect gestures based on height and/or multiple detections.

Figure 9A:
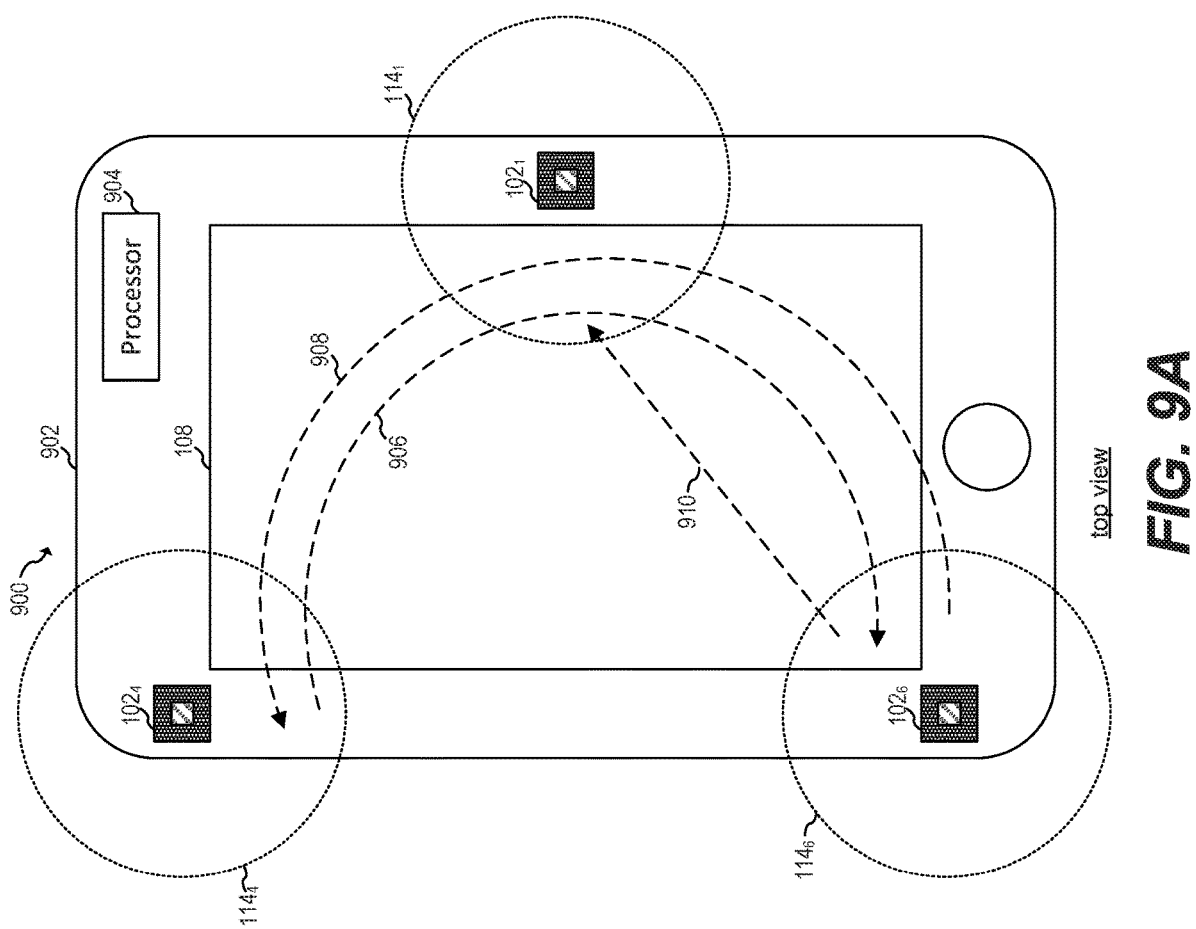
FIGS. 9A and 9B show possible gestures and their respective gesture signatures of a millimeter-wave radar system having three millimeter-wave radars, according to an embodiment of the present invention.
Figure 9B:
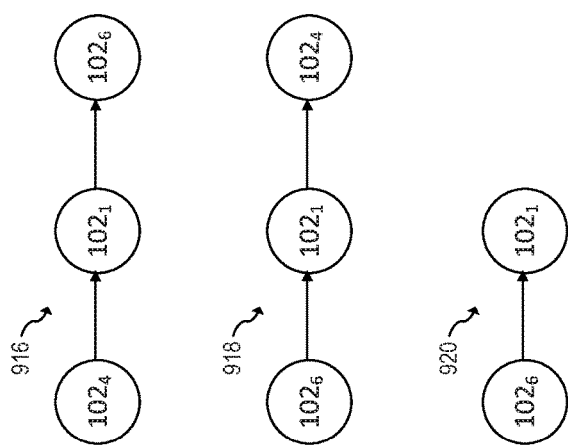

FIGS. 9A and 9B show possible gestures 906, 908 and 910, and their respective gesture signatures 916, 918 and 920, of millimeter-wave radar system 900 having three millimeter-wave radars 102, according to an embodiment of the present invention. Some embodiments may be implemented with millimeter-wave radars in monostatic, bistatic, or other configurations.

Gesture 906 correspond to an object having a trajectory from field of view $114_4$ to field of view $114_6$ passing through field of view $114_1$, as shown by gesture signature 916 of FIG. 9B. Gesture 908 correspond to an object having a trajectory from field of view $114_6$ to field of view $114_4$ passing through field of view $114_1$, as shown by gesture signature 918 of FIG. 9B. Gesture 906 correspond to an object having a trajectory from field of view $114_6$ to field of view $114_4$ without passing through field of view $114_1$, as shown by gesture signature 920 of FIG. 9B.

As shown, clockwise and counter-clockwise gestures may be detected by processor 904 and millimeter-wave radars $102_1$, $102_4$ and $102_6$. Millimeter-wave radar system 900 may also detect gestures based on height and/or multiple detections.

Figure 10:
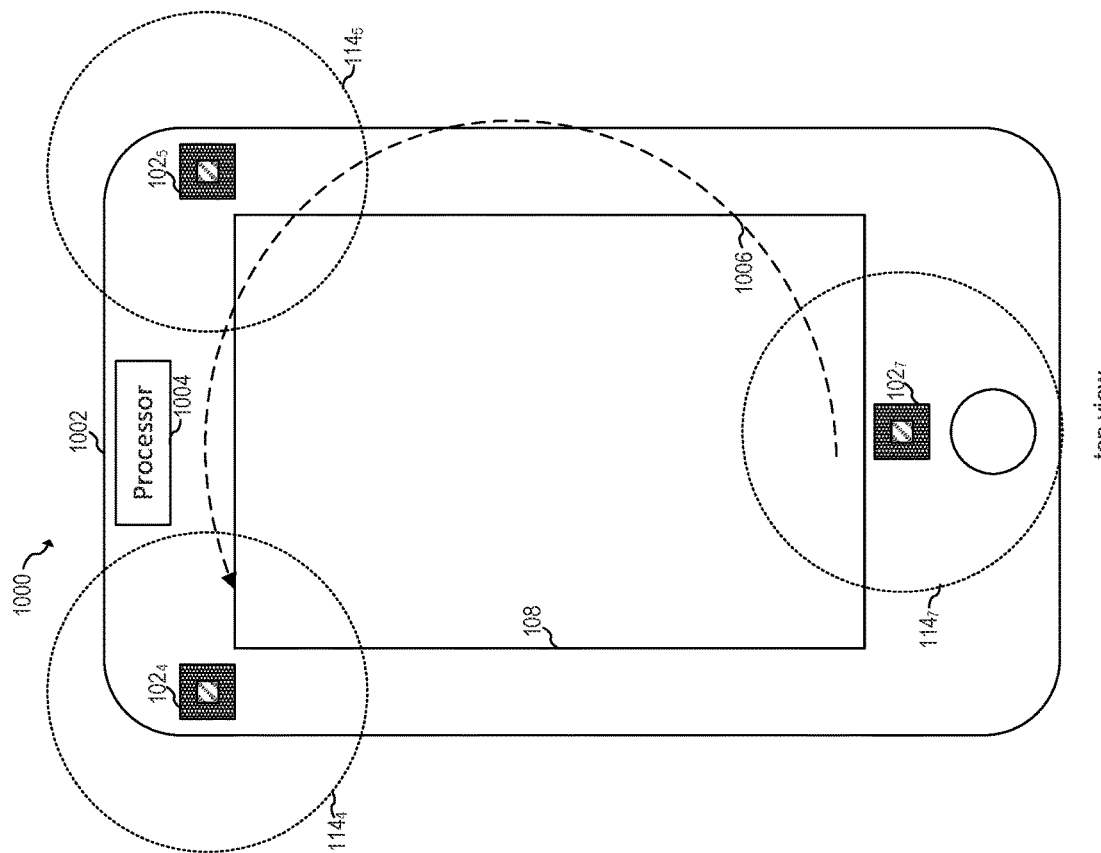
FIGS. 10 and 11 show respective top views of two millimeter-wave radar systems, each having three millimeter-wave radars, according to an embodiment of the present invention.
Figure 11:
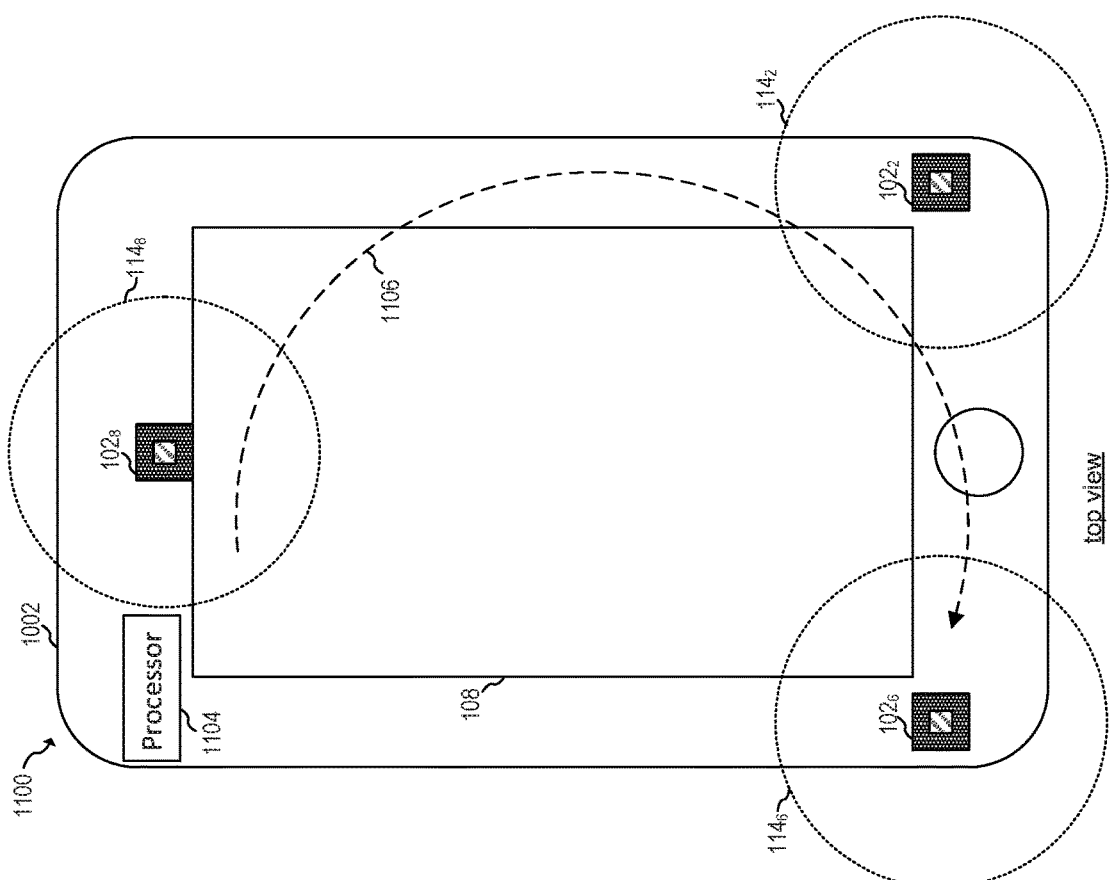

Other configurations are also capable of detecting clockwise or counter-clockwise gestures. For example, FIGS. 10 and 11 show respective top views of millimeter-wave radar systems 1000 and 1100 having three millimeter-wave radars 102, according to an embodiment of the present invention. Some embodiments may be implemented with millimeter-wave radars in monostatic, bistatic, or other configurations.

As shown, millimeter-wave radar systems 1000 and 1100 are capable of detecting clockwise and counter-clockwise gestures. Millimeter-wave radar systems 1000 and 1100 may also detect gestures based on height and/or multiple detections.

Figure 12:
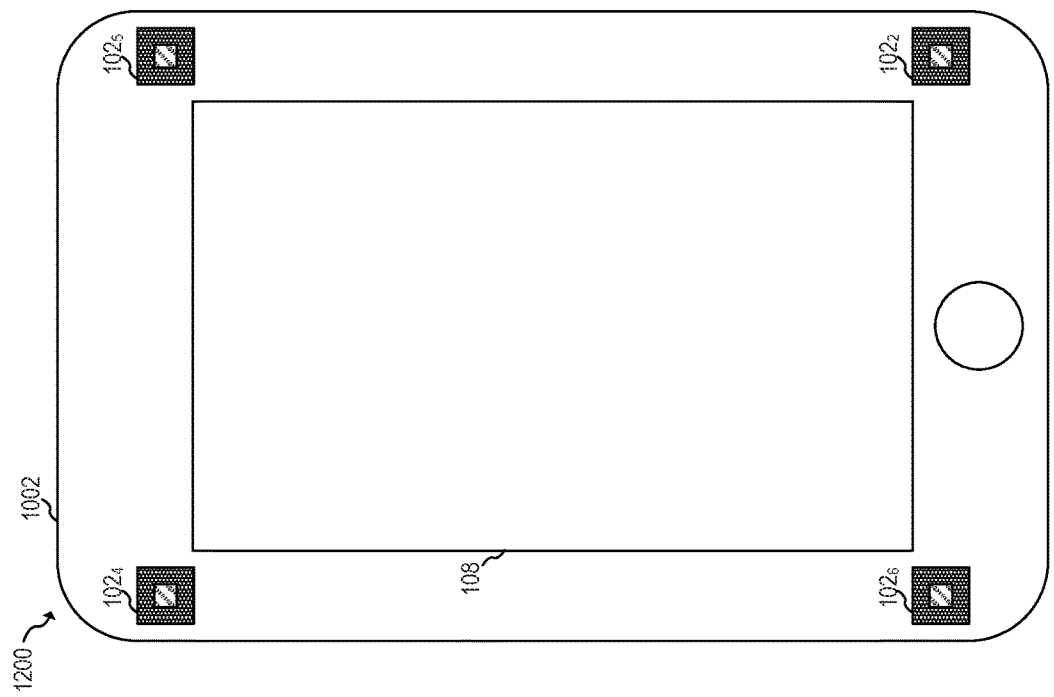
FIGS. 12 and 13 show respective top views of millimeter-wave radar systems having four millimeter-wave radars, according to an embodiment of the present invention.
Figure 13:
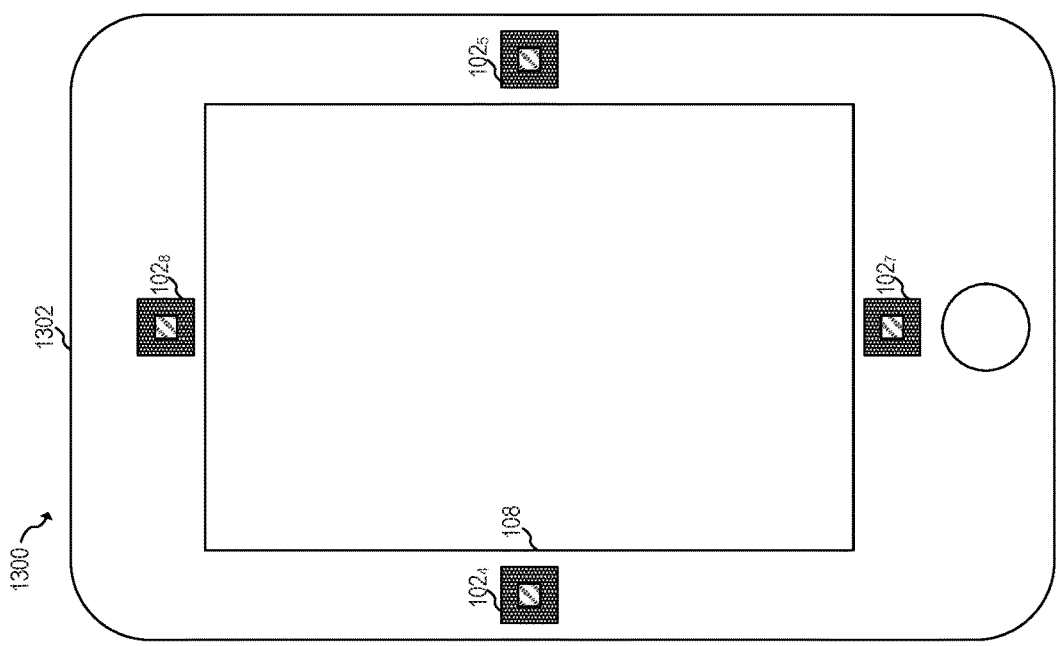

FIGS. 12 and 13 show respective top views of millimeter-wave radar systems 1200 and 1300 having four millimeter-wave radars 102, according to an embodiment of the present invention. Some embodiments may be implemented with millimeter-wave radars in monostatic, bistatic, or other configurations.

Figure 14:
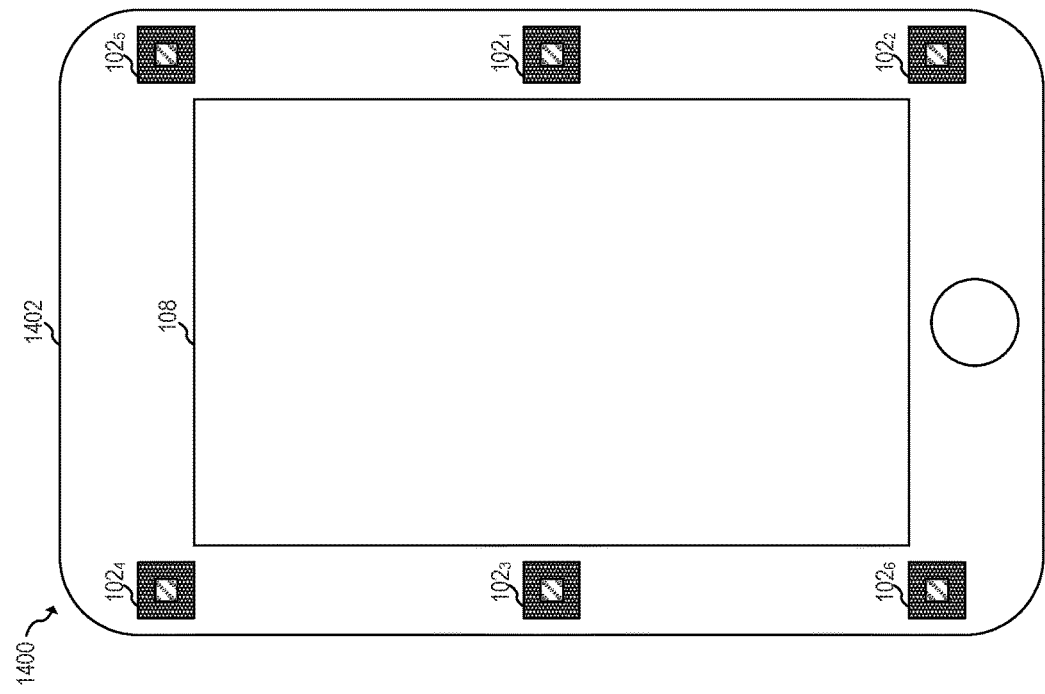
FIG. 14 shows a top view of a millimeter-wave radar system having six millimeter-wave radars, according to an embodiment of the present invention.

FIG. 14 shows a top view of millimeter-wave radar system 1400 having six millimeter-wave radars 102 according to an embodiment of the present invention. Some embodiments may be implemented with millimeter-wave radars in monostatic, bistatic, or other configurations.

Millimeter-wave radar systems 1200, 1300 and 1400 may detect horizontal, vertical, clockwise, counter-clockwise and other gestures, as well as gestures based on height and/or multiple detections, in a similar manner as described with respect to millimeter-wave radar systems 400, 500, 600, 700, 800, 900, 1000, 1100.

Figure 16:
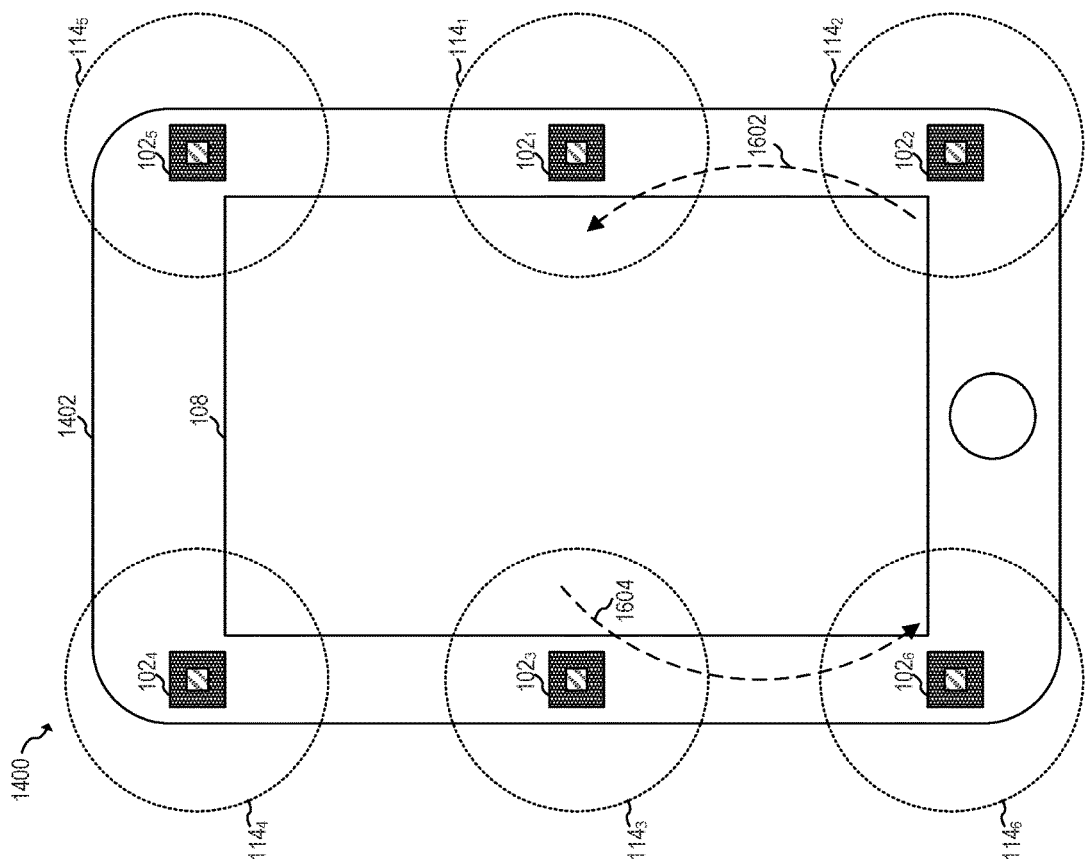
FIGS. 15-17 show non-limiting examples of use cases of the millimeter-wave radar system of FIG. 14, according to embodiments of the present invention.
Figure 15:
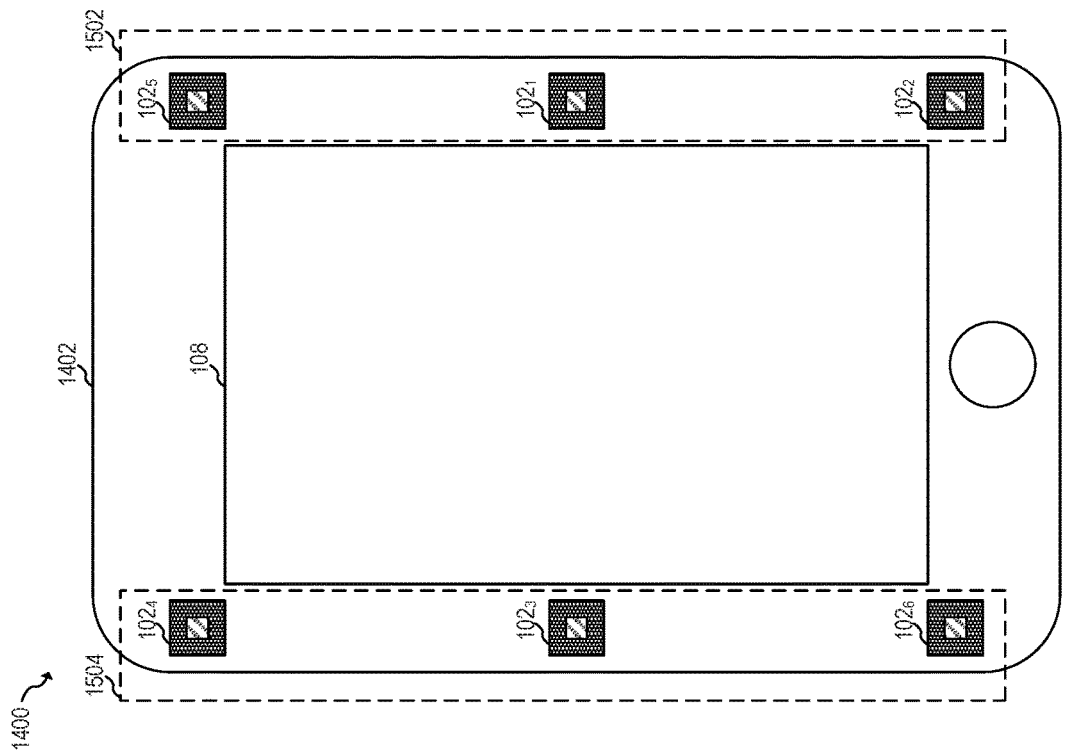
Figure 17:
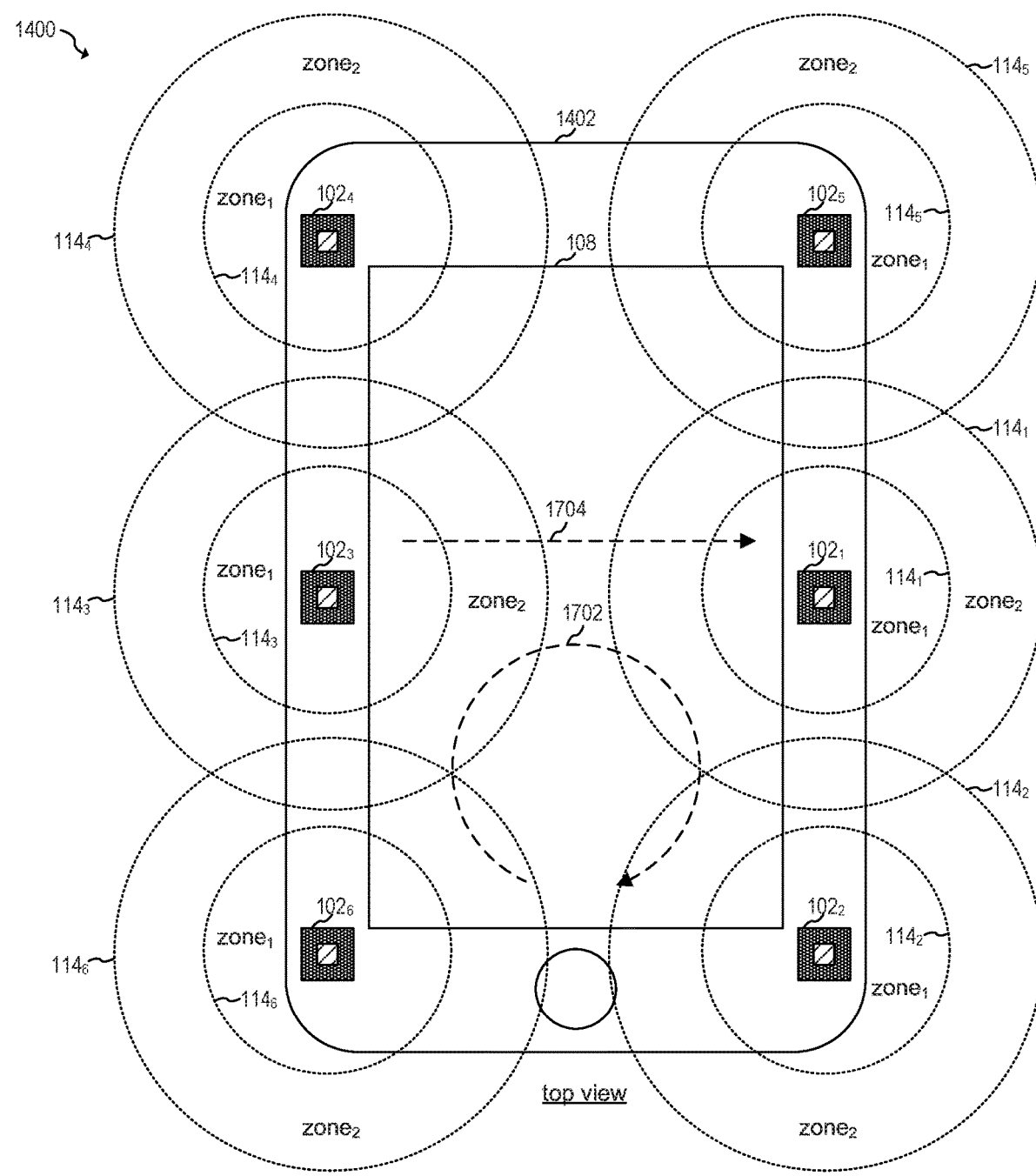

Millimeter-wave radar systems may be used for various types of use cases. FIGS. 15-17 show non-limiting examples of use cases of millimeter-wave radar system 1400, according to embodiments of the present invention. It is understood that some of the use cases described may be performed with millimeter-wave radar systems with other arrangements and having less millimeter-wave radars 102, such as millimeter-wave radar systems 400, 500, 600, 700, 800, 900, 1000, 1100, 1200 and 1300, or more millimeter-wave radar systems, such as having seven, eight, ten, or more millimeter-wave radars 102.

It is also understood that particular millimeter-wave radars 102, such as particular monostatic millimeter-wave radars, of millimeter-wave radar system 1400 (as shown in FIG. 15), may be associated to one or more millimeter-wave radar sets. A particular millimeter-wave radar set may behave as a virtual millimeter-wave radar system, such as described previously. For example, millimeter-wave radar system 1400 may include a millimeter-wave radar set that includes millimeter-wave radars $102_2$, $102_6$, $102_4$, and $102_5$ and does not include millimeter-wave radars $102_3$, and $102_1$. Such set may operate in a similar manner than millimeter-wave radar system 1200. As another example, a set may include millimeter-wave radars $102_1$, and $102_2$ without including millimeter-wave radars $102_3$, $102_6$, $102_4$, and $102_5$. Such set may operate in a similar manner than millimeter-wave radar system 400. In some embodiments, the set associations and the number of sets may be changed dynamically by adding or removing millimeter-wave radars from the set. For example, the dynamical changes may be based on user input or the state of the smartphone. In some embodiments, a single set is used at a given time in the millimeter-wave radar system. In other embodiments, more than one set is used at a given time. In some embodiments, the number of sets may also change dynamically.

Adding or removing millimeter-wave radars from a millimeter-wave radar set may be achieved in different ways. For example, in some embodiments, adding or removing millimeter-wave radars from a millimeter-wave radar set is achieved by enabling (e.g., active mode) or disabling (e.g., sleep mode or other low power mode) millimeter-wave radars 102. In other embodiments, a millimeter-wave radar may be removed from a millimeter-wave radar set by processor 1404 ignoring its output.

As another example, millimeter-wave radar system 1400 may associate millimeter-wave radars $102_1$, $102_2$, and $102_5$ to group (set) 1502 of millimeter-wave radars, and millimeter-wave radars $102_3$, $102_4$, and $102_6$ to group (set) 1504 of millimeter-wave radars. Each of groups 1502 and 1504 may detect gestures independently. In other words, detections of objects by millimeter-wave radars 102 of group 1504 are not included in the gesture signatures of group 1502 and vice-versa. In some embodiments, the commands executed depend on how the millimeter-wave radars 102 are grouped. In some embodiments, the default grouping is having a single group that includes all millimeter-wave radars 102 in millimeter-wave radar system 1400.

By operating each group of millimeter-wave radars independently, it is possible to allow simultaneous multi-finger or multi-hand control. For example, a game may be controlled by a human user by simultaneously using a left hand to perform gestures in front of group 1504 and using a right hand to perform gestures in front of group 1502. Other groupings are also possible. In other embodiments, gestures signatures detected by each set trigger independent commands irrespective of whether the detected gesture signatures occurred simultaneously or not. In an embodiment, a single gesture is used to trigger a plurality of actions, where each triggered action associated to one of the sets of millimeter-wave radars. In other words, a same gesture is detected by a plurality (e.g., all) of the sets of millimeter-wave radars, each set giving rise to a command being executed via detection of this gesture.

Simultaneous object detection may also be used to detect complex gestures. For example, as shown by FIG. 16, by simultaneously performing gestures 1602 and 1604, with, for example, two fingers of the same hand, it is possible to cause the rotation of a map displayed by a map app in touchscreen 108. Other complex gestures may be detected and associated with respective gesture signatures that are associated with respective commands. Functions such as front camera focusing and ranging, three-dimensional object tracking, application switching, scrolling up, down, left-to-right, right-to-left, diagonally, gaming control, user authentication by gesture patterns, tracking motion on top of touchscreen 108 using triangulation, volume dial control, app initiation and termination, switching between apps, as well as customizing each (e.g., monostatic) millimeter-wave radar 102 for different application are also possible. In some embodiments, gesture detections at different zones (ranges) are associated with different commands. For example, processor 1404 may detect a presence of an object in a first range zone (e.g., $zone_1$) of a plurality of range zones (e.g., four or more range zones) of field of view 114, where each range zone is associated with a respective command database. After determining a gesture signature based the detected presence of the object, processor 1404 may select a command from the command database of the range zone in which the object presence was detected based on the gesture signature, and cause execution of the selected command associated with the detected gesture signature. For example, FIG. 17 illustrates respective fields of view 114 of millimeter-wave radars 102 at heights $h_1$ and $h_2$. As shown in FIG. 17, in a video app, for example, gestures at $zone_2$ may be associated with fast-forward or backward. For example, gesture 1702 is a gesture of an object that has a trajectory that is sequentially detected by millimeter-wave radars $102_6$, $102_3$, $102_1$, and $102_2$ at height $h_2$, and may be associated with the function of fast-forwarding a video. The same sequence of detection at a different height (e.g., height $h_1$–$zone_1$) may have a different function associated with it. As another example, an object gesture associated with a sweep in height (not shown) in $zone_2$ may be associated with volume commands (e.g., increase or decrease volume).

Gestures in $zone_1$ may be associated with starting/stopping playback. For example, gesture 1704 is a gesture of an object that has a trajectory that is sequentially detected by millimeter-wave radars $102_3$, and $102_1$ at height $h_1$, and may be associated with stopping the video.

Figure 18A:
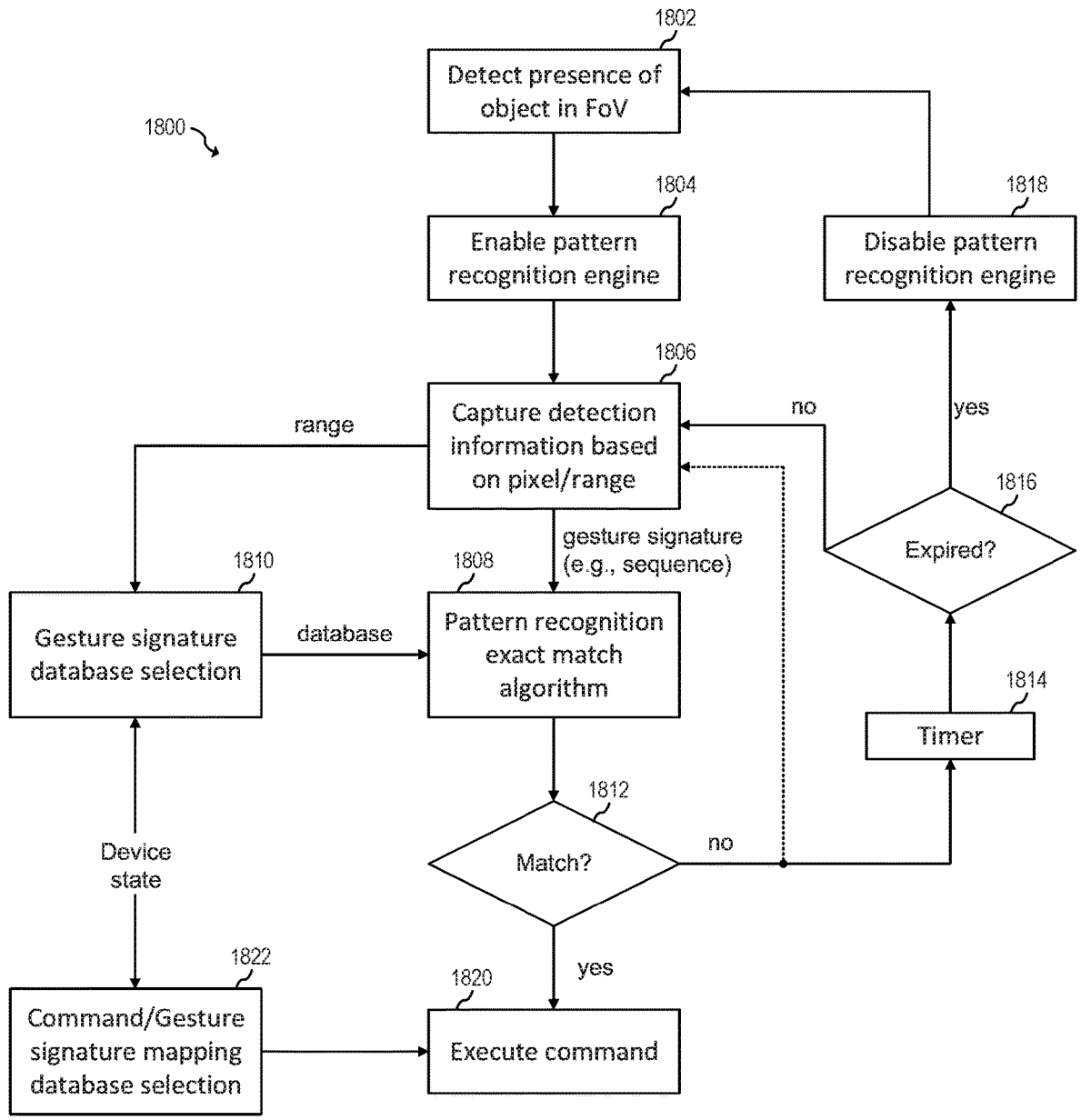
FIGS. 18A and 18B illustrate a flow chart of an embodiment method of gesture detection and associated command execution, according to an embodiment of the present invention.
Figure 18B:
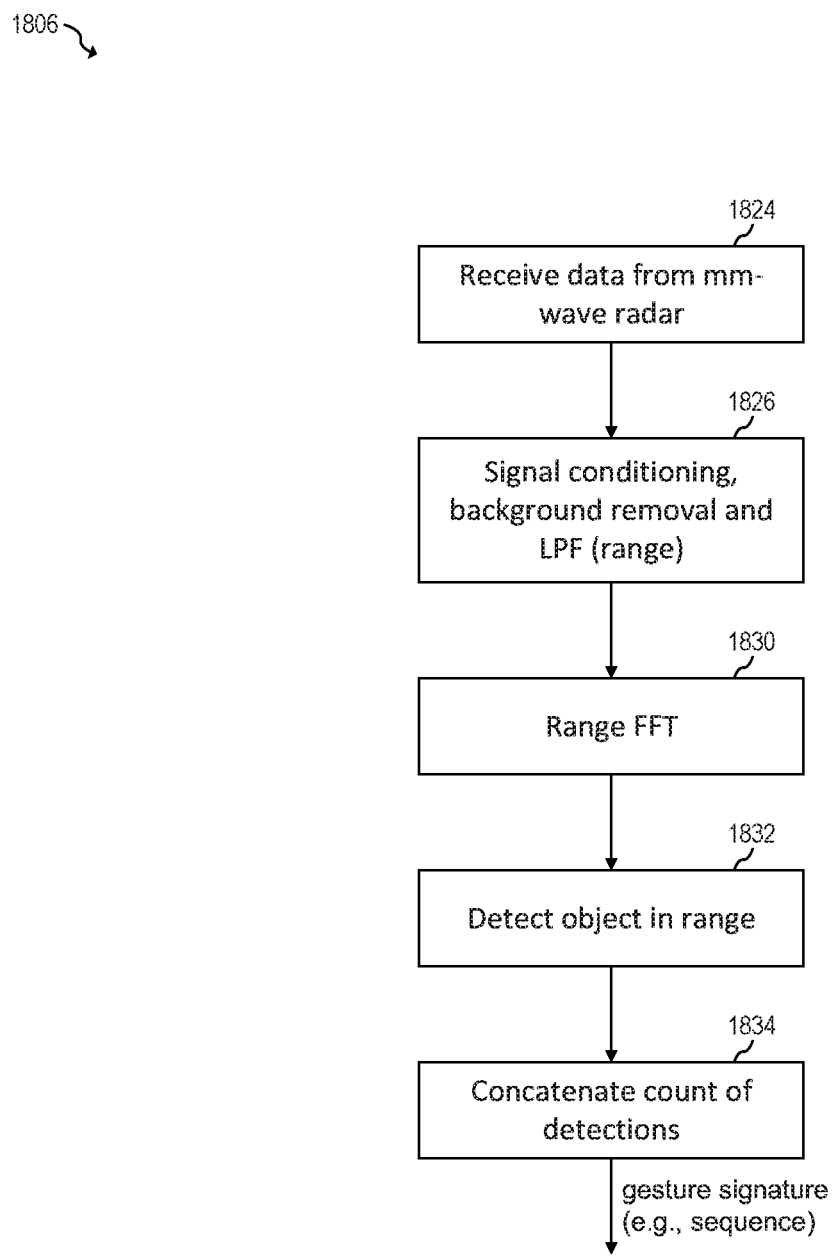

FIGS. 18A and 18B illustrate a flow chart of embodiment method 1800 of gesture detection and associated command execution, according to an embodiment of the present invention. Method 1800 may be implemented in millimeter-wave radar systems such as millimeter-wave radar systems 400, 500, 600, 700, 800, 900, 1000, 1100, 1200, 1300, and 1400, for example. Method 1800 may also be implemented by other radar system implementations and in other ways known in the art.

During step 1802, presence of an object, such as a human finger, is detected in one or more of the fields of view (e.g., 114) of the millimeter-wave radars (e.g., 102) of the millimeter-wave radar system. After presence of the object is detected in one or more of the fields of views, the pattern recognition engine is enabled during step 1804. The pattern recognition engine may be, for example, a hardware, software, or a hardware/software combination configured to associate detected gesture signatures with gesture signatures in a database, as described in steps 1808 and 1812. In some embodiments, the pattern recognition engine is always enabled for real-time continuous monitoring.

During step 1806, each of the millimeter-wave radars (which may be referred to as a pixel) detects and captures the objects presence and associated range and time of detection as the object's moves within its respective field of view. In some embodiments, the range information refers to whether the object was detected in a valid field of view or in a field of view that is configured to be ignored (e.g., very close to the touchscreen). In other embodiments, the range information includes information of the zone of detection. In yet other embodiments, the range information includes multiple bits based on the distance from the respective (e.g., monostatic) millimeter-wave radar.

In some embodiments, the time information is obtained with reference to a common clock. In other embodiments, time information is obtained with respect to time stamps or other synchronization mechanism. Additional details of step 1806 are provided in FIG. 18B and associated description.

During step 1810, the database of gesture signatures is selected based on, for example, range of detection of particular pixels. It may also be selected based on the state of the device as well (e.g., device is in sleep mode, or running a particular app). The particular sequence of pixel detections and associated range and times are compared with the gesture signatures in the selected database for a match during steps 1808 and 1812. Algorithm such as the Knuth-Morris-Pratt algorithm may be used for pattern recognition.

If a match is not detected and a timer has not expired, the millimeter-wave radars continue capturing detection information during step 1806. If a match is not detected and the timer has expired, the pattern recognition engine is disabled during step 1818 and waits to detect a presence of an object during step 1802. In some embodiments, the expiration timer is not implemented and the millimeter-wave radars continuously capture detection information. In some embodiments, a mechanism to reset the current sequence is implemented, such as a moving window or based on a second timer, for example.

If a match is detected during step 1812, the command associated with the gesture signature detected is executed during step 1820. In some embodiments, the particular command associated with the particular gesture signature is selected from a command database. The command data based may be fixed in some embodiments. In other embodiments, the command database changes based on the device state (e.g., a particular app running in a smartphone), or based on the range zone in which the detected gesture occurred, for example. The command database is selected during step 1822.

FIG. 18B shows a possible implementation of step 1806 for capturing detection information on the millimeter-wave radars, according to an embodiment of the present invention. In step 1824, live radar data is collected from one or more (e.g., monostatic) millimeter-wave radars. In step 1826, signal conditioning, low pass filtering and background removal is performed. During step 1826, radar data received during step 402 is filtered, DC components are removed, and IF data is filtered to, e.g., remove the Tx-Rx self-interference and optionally pre-filtering the interference colored noise. In some embodiments, filtering includes removing data outliers that have significantly different values from other neighboring range-gate measurements. Thus, this filtering also serves to remove background noise from the radar data. In a specific example, a Hampel filter is applied with a sliding window at each range-gate to remove such outliers. Alternatively, other filtering for range preprocessing known in the art may be used.

In step 1830, a series of FFTs are performed on conditioned radar data produced during step 1826. In some embodiments, a windowed FFT having a length of the chirp (e.g., 256 samples) is calculated along each waveform for each of a predetermined number of chirps in a frame of data. Alternatively, other frame lengths may be used. The FFTs of each waveform or chirp may be referred to as a "range FFT." In alternative embodiments, other transform types could be used besides an FFT, such as a Discrete Fourier Transform (DFT) or a z-transform.

During step 1832, the object or objects (e.g., fingers) are detected by one or more of the millimeter-wave radars. In some embodiments, the object closest to the millimeter-wave radar is associated with the detection (detections of objects farther than the nearest detection are ignored).

During step 1834, repeated detections are collapsed into a single detection and the sequence of detections is sent for further processing by, for example, the pattern recognition engine. For example, a finger holding steady for a period of time (e.g., 100 ms) inside the detectable field of view may generate multiple counts of detection. Instead of reporting a string of repeated equal counts, some embodiments report a single count for purposes of pattern recognition.

Figure 19:
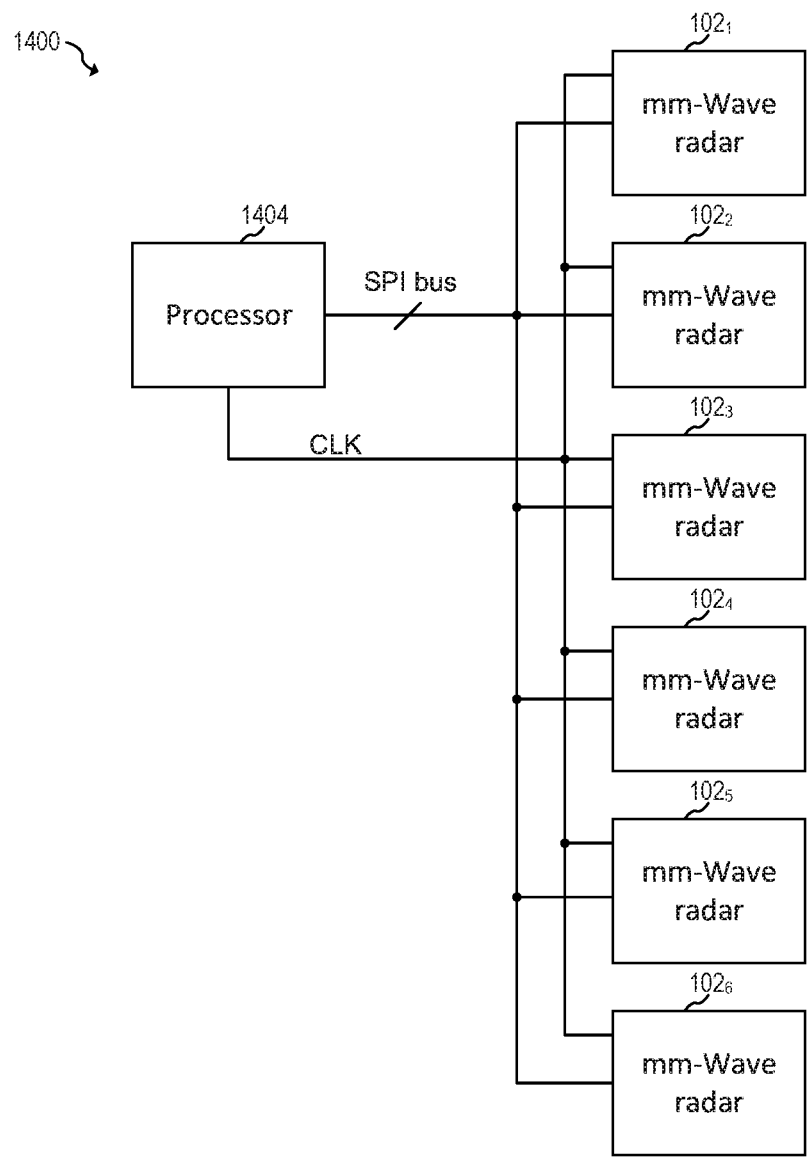
FIG. 19 shows a schematic diagram of the millimeter-wave radar system of FIG. 14, according to an embodiment of the present invention.

FIG. 19 shows a schematic diagram of millimeter-wave radar system 1400, according to an embodiment of the present invention. Some embodiments may be implemented with millimeter-wave radars in monostatic, bistatic, or other configurations.

As shown by FIG. 19, processor 1404 communicates with each of millimeter-wave radars 102 by using an SPI bus. Millimeter-wave radars 102 also receive a common clock CLK, which is used as a reference for the timing of object detection.

In some embodiments, other wired or wireless communication protocols may be used. In some embodiments, other synchronization methods, such as using time stamps, may be used instead of or in addition to having a common clock.

Figure 20:
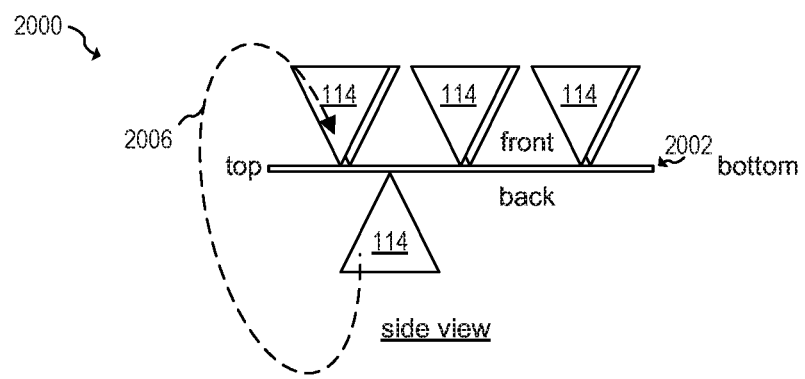
FIG. 20 shows a side view of a millimeter-wave radar system having six millimeter-wave radars pointing outwards from the front of a smartphone and one millimeter-wave radar pointing outwards from the back of the smartphone, according to an embodiment of the present invention.

Some millimeter-wave radar systems have one or more (e.g., monostatic) millimeter-wave radars point in a direction different from the front of the device pointing outwards. For example, FIG. 20 shows a side view of millimeter-wave radar system 2000 having six millimeter-wave radars 102 pointing outwards from the front of smartphone 2002 and one millimeter-wave radar 102 pointing outwards from the back of smartphone 2002, according to an embodiment of the present invention. Some embodiments may be implemented with millimeter-wave radars in monostatic, bistatic, or other configurations.

A millimeter-wave radar point towards the back of smartphone 2002 may be used, for example, to control apps without obstructing the user's view of the display. Gestures such as gesture 2006 involving millimeter-wave radars pointing towards different directions are also possible. Other configurations, such as having millimeter-wave radars pointing towards a side (e.g., left or right), top, or bottom of smartphone 2002, or a combination thereof, are also possible.

Some embodiments may combine one or more of the features described in millimeter-wave radar systems 100, 200, 400, 500, 600, 700, 800, 900, 1000, 1100, 1200, 1300, 1400, and 2000. For example, with respect to FIG. 20, in some embodiments, gesture 2006 may be mapped to a gesture signature (not shown) that is associated with object detection in respective fields of view 114 while ignoring range information. Other embodiments may consider the range zone of one or more fields of view 114 in which the object was detected. In yet other embodiments, the range trajectory in one or more fields of view 114 may also be considered. Other combinations are also possible.

Some embodiments may combine gesture detection systems and methods described herein with other gesture detection systems and methods. For example, in some embodiments, a processor may extract from one or more of the millimeter-wave radars 102 micro-Doppler signatures from an inverse synthetic-aperture radar (ISAR) image to determine a gesture, such as described in U.S. patent application Ser. No. 15/937,283, filed on Mar. 27, 2018, which is incorporated herein by reference.

Example embodiments of the present invention are summarized here. Other embodiments can also be understood from the entirety of the specification and the claims filed herein.

EXAMPLE 1

A controller configured to be coupled to a millimeter-wave radar mounted on a device, the millimeter-wave radar including a field of view in a direction away from the device, the controller configured to: detect a presence of an object in a first range zone of a plurality of range zones of the field of view, where each range zone of the plurality of range zones respectively corresponds to different distance ranges relative to the device, and where each range zone is associated with a respective command database; determine a gesture signature based on detecting the presence of the object in the first range zone of the field of view; and cause execution of a command chosen from the respective command database associated with the first range zone as a function of the gesture signature.

EXAMPLE 2

The controller of example 1, where the detected presence of the object at a first time corresponds to a range zone of the plurality of range zones that is closest to the device in which the presence of the object is detected at the first time.

EXAMPLE 3

The controller of one of examples 1 or 2, where the plurality of range zones includes four or more range zones.

EXAMPLE 4

The controller of one of examples 1 to 3, where the object includes a human finger.

EXAMPLE 5

The controller of one of examples 1 to 4, where each range zone of the plurality of range zones is associated with a respective database of gesture signatures, where the controller is further configured to determine the gesture signature based on a range trajectory of the object in the first range zone and on the respective database of gesture signatures.

EXAMPLE 6

The controller of one of examples 1 to 5, where the plurality of range zones includes a second range zone, and where the controller is further configured to determine the gesture signature based on detecting the presence of the object in the first range zone at a first time, and in the second range zone at a second time after the first time.

EXAMPLE 7

The controller of one of examples 1 to 6, where the first range zone and the second range zone partially overlap.

EXAMPLE 8

The controller of one of examples 1 to 7, further configured to dynamically change a location of the first range zone or the second range zone based on a state of the device.

EXAMPLE 9

A device including: a screen; a millimeter-wave radar mounted on the device, the millimeter-wave radar having a field of view; and a controller configured to: detect a presence of an object in a first range zone of a plurality of range zones of the field of view, where each range zone of the plurality of range zones respectively corresponds to different distance ranges relative to the device, and where each range zone is associated with a respective command database; determine a gesture signature based on detecting the presence of the object in the first range zone of the field of view; and cause execution of a command chosen from the respective command database associated with the first range zone as a function of the gesture signature.

EXAMPLE 10

The device of example 9, where the millimeter-wave radar is a monostatic millimeter-wave radar.

EXAMPLE 11

The device of one of examples 9 or 10, where each range zone of the plurality of range zones is associated with a respective database of gesture signatures, where the controller is further configured to determine the gesture signature based on a range trajectory of the object in the first range zone from a first range to a second range, the first range being closer to the screen that the second range, and where the command includes increasing a volume of the device or another device based on the determined gesture signature.

EXAMPLE 12

The device of one of examples 9 to 11, where the controller is configured to ignore the presence of the object in the field of view when the object is at first distance or closer to the screen.

EXAMPLE 13

The device of one of examples 9 to 12, where the first distance is between 2 cm and 5 cm.

EXAMPLE 14

The device of one of examples 9 to 13, where the screen is a touchscreen, where the touchscreen is disposed in a front of the device, and where the field of view has a direction away from the touchscreen and partially covering the front of the device.

EXAMPLE 15

The device of one of examples 9 to 14, where the screen is disposed in a front of the device, and where the field of view has a direction away from the device and partially covering a back of the device.

EXAMPLE 16

A method including: detecting a presence of an object in a first range zone of a plurality of range zones of a field of view of a millimeter-wave radar mounted on a device, the plurality of range zones respectively corresponding to different distance ranges relative to the device, where each range zone of the plurality of range zones is associated with a respective command database; determining a gesture signature based on detecting the presence of the object in the first range zone; choosing a command from the respective command database associated with the first range zone based on the determined gesture signature; and executing the command.

EXAMPLE 17

The method of example 16, further including receiving information from the millimeter-wave radar via wireless communication.

EXAMPLE 18

The method of one of examples 16 or 17, further including communicating with the millimeter-wave radar using a serial peripheral interface (SPI).

EXAMPLE 19

The method of one of examples 16 to 18, where detecting the presence of the object in the first range zone includes detecting the presence of the object with at least 8-bit accuracy.

EXAMPLE 20

The method of one of examples 16 to 19, where the device is a smartphone, where the determined gesture signature is associated with a trajectory of the object moving from a first range of the first range zone to a second range of the first range zone, and where the command includes adjusting a volume of the smartphone based on the trajectory of the object.

EXAMPLE 21

A device including: a screen; a plurality of millimeter-wave radars mounted on the device, each millimeter-wave radar of the plurality of millimeter-wave radars having a field of view that includes one or more range zones; and a controller configured to: detect a first presence of an object in a first range zone of a field of view of a first millimeter-wave radar; detect a second presence of the object in a first range zone of a field of view of a second millimeter-wave radar; determine a gesture signature based on detecting the first presence and the second presence; and execute a command based on the determined gesture signature.

EXAMPLE 22

The device of example 21, where the first range zone of the field of view of the first millimeter-wave radar extends between a first range and a second range, where the first range zone of the field of view of the second millimeter-wave radar extends between a third range and a fourth range, and where the first range is equal to the third range and the second range is equal to the fourth range.

EXAMPLE 23

The device of one of examples 21 or 22, where the first range zone of the field of view of the first millimeter-wave radar extends between a first range and a second range, the first range being closer to the device than the second range, where the first range zone of the field of view of the second millimeter-wave radar extends between a third range and a fourth range, the third range being closer to the device than the fourth range, and where the second range is closer to the device than the third range.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A controller configured to be coupled to a plurality of millimeter-wave radars mounted on a device grouped into a plurality of millimeter-wave radar sets, the millimeter-wave radars comprising a field of view in a direction away from the device, the controller configured to:
   detect a presence of an object in a first range zone of a plurality of range zones of the field of view, wherein each range zone of the plurality of range zones respectively corresponds to different distance ranges relative to the device, and wherein each range zone is associated with a respective command database;
   determine a gesture signature based on detecting the presence of the object in the first range zone of the field of view using the plurality of millimeter-wave radars synchronized to a time reference housed in the device;
   cause execution of a command chosen from the respective command database associated with the first range zone as a function of the gesture signature; and
   dynamically change a number of the plurality of millimeter-wave radar sets of the device by selectively enabling or disabling millimeter-wave radars from at least one of the plurality of millimeter-wave radar sets based on user input to the device, to enable a first command execution from a first radar set simultaneously with a second command execution from a second radar set, wherein the first command execution and the second command execution are associated with the gesture signature.

2. The controller of claim 1, wherein the detected presence of the object at a first time corresponds to a range zone of the plurality of range zones that is closest to the device in which the presence of the object is detected at the first time.

3. The controller of claim 1, wherein the plurality of range zones comprises four or more range zones.

4. The controller of claim 1, wherein the object comprises a human finger.

5. The controller of claim 1, wherein each range zone of the plurality of range zones is associated with a respective database of gesture signatures, wherein the controller is further configured to determine the gesture signature based on a range trajectory of the object in the first range zone and on the respective database of gesture signatures.

6. The controller of claim 1, wherein the plurality of range zones comprises a second range zone, and wherein the controller is further configured to determine the gesture signature based on detecting the presence of the object in the first range zone at a first time, and in the second range zone at a second time after the first time.

7. The controller of claim 6, wherein the first range zone and the second range zone partially overlap.

8. The controller of claim 6, further configured to dynamically change a location of the first range zone or the second range zone based on a state of the device.

9. A device comprising:
a screen;
a plurality of millimeter-wave radars mounted on the device grouped into a plurality of millimeter-wave radar sets, the millimeter-wave radars having a field of view; and
a controller configured to:
detect a presence of an object in a first range zone of a plurality of range zones of the field of view, wherein each range zone of the plurality of range zones respectively corresponds to different distance ranges relative to the device, and wherein each range zone is associated with a respective command database;
determine a gesture signature based on detecting the presence of the object in the first range zone of the field of view using the plurality of millimeter-wave radars synchronized to a time reference housed in the device;
cause execution of a command chosen from the respective command database associated with the first range zone as a function of the gesture signature; and
dynamically change a number of the plurality of millimeter-wave radar sets of the device by selectively enabling or disabling millimeter-wave radars from at least one of the plurality of millimeter-wave radar sets based on user input to the device, to enable a first command execution from a first radar set simultaneously with a second command execution from a second radar set, wherein the first command execution and the second command execution are associated with the gesture signature.

10. The device of claim 9, wherein at least one of the millimeter-wave radars is a monostatic millimeter-wave radar.

11. The device of claim 9, wherein each range zone of the plurality of range zones is associated with a respective database of gesture signatures, wherein the controller is further configured to determine the gesture signature based on a range trajectory of the object in the first range zone from a first range to a second range, the first range being closer to the screen than the second range, and wherein the command comprises increasing a volume of the device or another device based on the determined gesture signature.

12. The device of claim 9, wherein the controller is configured to ignore the presence of the object in the field of view when the object is at first distance or closer to the screen.

13. The device of claim 12, wherein the first distance is between 2 cm and 5 cm.

14. The device of claim 9, wherein the screen is a touchscreen, wherein the touchscreen is disposed in a front of the device, and wherein the field of view has a direction away from the touchscreen and partially covering the front of the device.

15. The device of claim 9, wherein the screen is disposed in a front of the device, and wherein the field of view has a direction away from the device and partially covering a back of the device.

16. A method comprising:
detecting a presence of an object in a first range zone of a plurality of range zones of a field of view of a plurality of millimeter-wave radars mounted on a device grouped into a plurality of millimeter-wave radar sets, the plurality of range zones respectively corresponding to different distance ranges relative to the device, wherein each range zone of the plurality of range zones is associated with a respective command database;
determining a gesture signature based on detecting the presence of the object in the first range zone using the plurality of millimeter-wave radars synchronized to a time reference housed in the device;
choosing a command from the respective command database associated with the first range zone based on the determined gesture signature;
executing the command; and
dynamically change a number of the plurality of millimeter-wave radar sets of the device by selectively enabling or disabling millimeter-wave radars from at least one of the plurality of millimeter-wave radar sets based on user input to the device, to enable a first command execution from a first radar set simultaneously with a second command execution from a second radar set, wherein the first command execution and the second command execution are associated with the gesture signature.

17. The method of claim 16, further comprising receiving information from the millimeter-wave radars via wireless communication.

18. The method of claim 16, further comprising communicating with the millimeter-wave radars using a serial peripheral interface (SPI).

19. The method of claim 16, wherein detecting the presence of the object in the first range zone comprises detecting the presence of the object with at least 8-bit accuracy.

20. The method of claim 16, wherein the device is a smartphone, wherein the determined gesture signature is associated with a trajectory of the object moving from a first range of the first range zone to a second range of the first range zone, and wherein the command comprises adjusting a volume of the smartphone based on the trajectory of the object.

* * * * *